(12) United States Patent
Rokey et al.

(10) Patent No.: US 10,736,340 B1
(45) Date of Patent: Aug. 11, 2020

(54) DUAL EXTRUSION METHOD AND APPARATUS FOR PET FOOD PRODUCTION USING MEAT SLURRIES

(71) Applicant: Wenger Manufacturing Inc., Sabetha, KS (US)

(72) Inventors: Galen J. Rokey, Sabetha, KS (US); LaVon Wenger, Sabetha, KS (US)

(73) Assignee: Wenger Manufacturing Inc., Sabetha, KS (US)

(*) Notice: Subject to any disclaimer, the term of this patent is extended or adjusted under 35 U.S.C. 154(b) by 0 days.

(21) Appl. No.: 16/287,866

(22) Filed: Feb. 27, 2019

(51) Int. Cl.
| | | |
|---|---|---|
| *A23K 40/25* | (2016.01) | |
| *A23K 10/20* | (2016.01) | |
| *A23K 10/30* | (2016.01) | |
| *A23N 17/00* | (2006.01) | |
| *A23K 50/42* | (2016.01) | |

(Continued)

(52) U.S. Cl.
CPC ............ *A23K 40/25* (2016.05); *A22C 7/0023* (2013.01); *A22C 7/0092* (2013.01); *A23B 4/03* (2013.01); *A23B 4/031* (2013.01); *A23K 10/20* (2016.05); *A23K 10/26* (2016.05); *A23K 10/30* (2016.05); *A23K 30/20* (2016.05); *A23K 50/42* (2016.05); *A23N 17/002* (2013.01);
(Continued)

(58) Field of Classification Search
CPC ..................... A23K 10/20; A23K 40/25; A23K 50/40–50/48; A23K 10/30; A23K 10/24; A23K 10/26; A23K 30/20; A23P 30/20; A22C 7/0023; A22C 7/0092; A22C 17/0026; A23B 4/03–4/031; A23L 13/60–13/67; A23N 17/002; A23N 17/005; A23N 17/007; A23N 1/00; B30B 9/12–9/18

USPC ........................................................ 426/516
See application file for complete search history.

(56) References Cited

U.S. PATENT DOCUMENTS

| | | | | |
|---|---|---|---|---|
| 3,450,537 A | * | 6/1969 | Filstrup ..................... | A23J 1/06 426/456 |
| 3,594,190 A | * | 7/1971 | Eslinger ................. | A22C 17/04 426/646 |

(Continued)

FOREIGN PATENT DOCUMENTS

| CN | 105559118 A | 5/2016 |
|---|---|---|
| CN | 205528350 U | 8/2016 |

(Continued)

OTHER PUBLICATIONS

International Search Report and Written Opinion dated Jan. 17, 2020, in PCT/US2019/053371.

(Continued)

*Primary Examiner* — Drew E Becker
(74) *Attorney, Agent, or Firm* — Hovey Williams LLP

(57) ABSTRACT

High meat content extruded pet foods and methods of preparation thereof, preferably include initial treatment of a high moisture meat slurry to create a dewatered meat fraction and a liquid fraction. The liquid fraction is directed to an extruder, along with typical dry pet food ingredients, in order to create an extruded intermediate. This intermediate is then mixed with the dewatered meat fraction, and the mixture is then extruded and dried to create a final pet food. The methods may be carried out using separate processing systems each including a mixer, an extruder, and a drying assembly, in order to maximize production rates.

25 Claims, 15 Drawing Sheets

(51) Int. Cl.
*A23K 10/26* (2016.01)
*A23K 30/20* (2016.01)
*A23P 30/20* (2016.01)
*A23B 4/03* (2006.01)
*A22C 7/00* (2006.01)

(52) U.S. Cl.
CPC ......... *A23N 17/005* (2013.01); *A23N 17/007* (2013.01); *A23P 30/20* (2016.08)

(56) References Cited

U.S. PATENT DOCUMENTS

| | | | | |
|---|---|---|---|---|
| 3,976,799 | A * | 8/1976 | Kelly, Jr. | A23K 40/20 426/311 |
| 4,022,915 | A * | 5/1977 | Zukerman | A23K 40/20 426/72 |
| 4,040,768 | A | 8/1977 | Christian | |
| 4,185,123 | A * | 1/1980 | Wenger | A23J 3/227 426/272 |
| 4,330,562 | A * | 5/1982 | Nassar | A23K 40/20 426/310 |
| 4,542,686 | A * | 9/1985 | Bansal | A23K 40/20 366/336 |
| 4,729,902 | A * | 3/1988 | Urman | A23K 10/24 426/521 |
| 5,252,351 | A * | 10/1993 | Cox | A23L 7/135 426/516 |
| 5,695,797 | A | 12/1997 | Geromini et al. | |
| 5,997,934 | A * | 12/1999 | Geromini | A23K 40/20 425/207 |
| 6,238,726 | B1 | 5/2001 | Fischer | |
| 6,550,376 | B2 | 4/2003 | Johnston | |
| 6,609,819 | B2 | 8/2003 | Hauck et al. | |
| 7,521,076 | B1 | 4/2009 | Wenger et al. | |
| 8,999,422 | B2 * | 4/2015 | Wenger | A23K 40/20 426/465 |
| 2002/0122850 | A1 * | 9/2002 | Kartchner | A23J 1/001 426/241 |
| 2004/0086616 | A1 | 5/2004 | Nie et al. | |
| 2006/0210695 | A1 * | 9/2006 | Ganjyal | A23J 3/18 426/656 |
| 2007/0077336 | A1 * | 4/2007 | Fulcher | A22C 21/0069 426/332 |
| 2007/0163966 | A1 * | 7/2007 | Hilgren | C02F 1/004 210/748.11 |
| 2008/0248167 | A1 | 10/2008 | McMindes et al. | |
| 2009/0324790 | A1 * | 12/2009 | Hilgren | A22B 7/008 426/335 |
| 2011/0262609 | A1 | 10/2011 | Wenger et al. | |
| 2012/0237642 | A1 | 9/2012 | Gardewin | |
| 2013/0264264 | A1 | 10/2013 | Lehoux et al. | |
| 2014/0087044 | A1 * | 3/2014 | Wenger | A23K 40/20 426/465 |
| 2016/0219904 | A1 | 8/2016 | Reynes | |
| 2016/0330998 | A1 * | 11/2016 | Jimenez-Marquez | A23K 20/189 |
| 2017/0013848 | A1 | 1/2017 | Jorgensen et al. | |
| 2018/0228183 | A1 * | 8/2018 | Wenger | A23K 30/20 |
| 2018/0229197 | A1 * | 8/2018 | Wenger | B01F 7/00808 |
| 2019/0075822 | A1 * | 3/2019 | Wenger | A23K 10/20 |
| 2019/0233316 | A1 * | 8/2019 | Miller | A22B 5/00 |
| 2019/0364929 | A1 * | 12/2019 | Wenger | A23L 13/52 |
| 2020/0060308 | A1 * | 2/2020 | Manchuliantsau | A23K 10/37 |

FOREIGN PATENT DOCUMENTS

| | | |
|---|---|---|
| CN | 106418615 A | 2/2017 |
| CN | 206724651 U | 12/2017 |
| EP | 0184930 A1 | 6/1986 |
| WO | 2018152346 A1 | 8/2018 |

OTHER PUBLICATIONS

Rokey et al. "Pet Food Extrusion" presentation. 68th Reciprocal Meat Conference, 2015.
International Search Report and Written Opinion in PCT/US18/40449, dated Nov. 9, 2018.

* cited by examiner

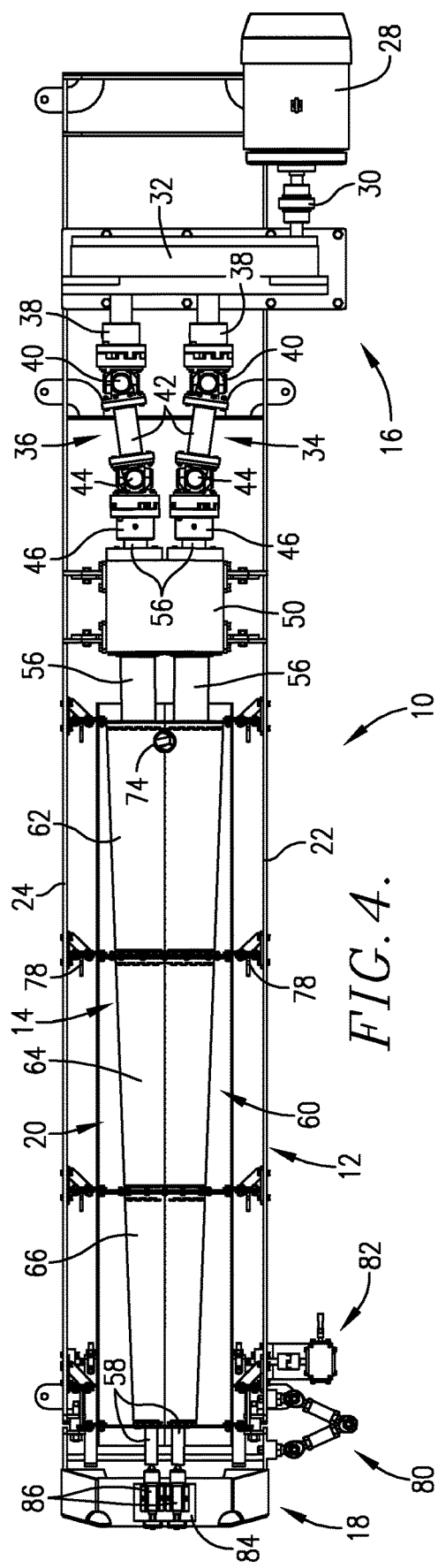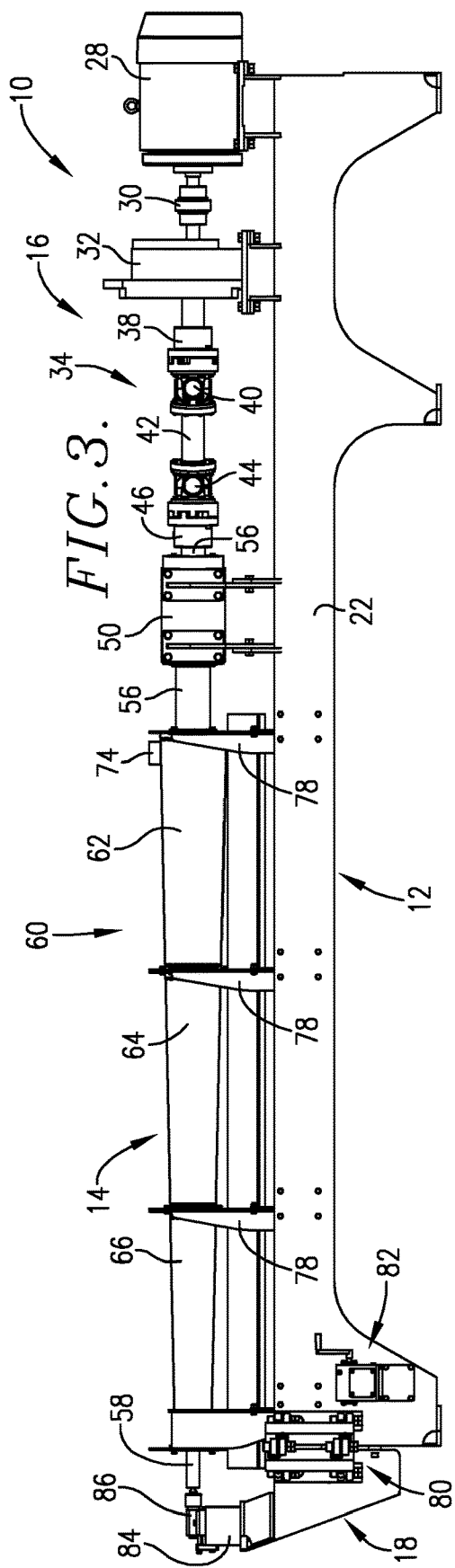

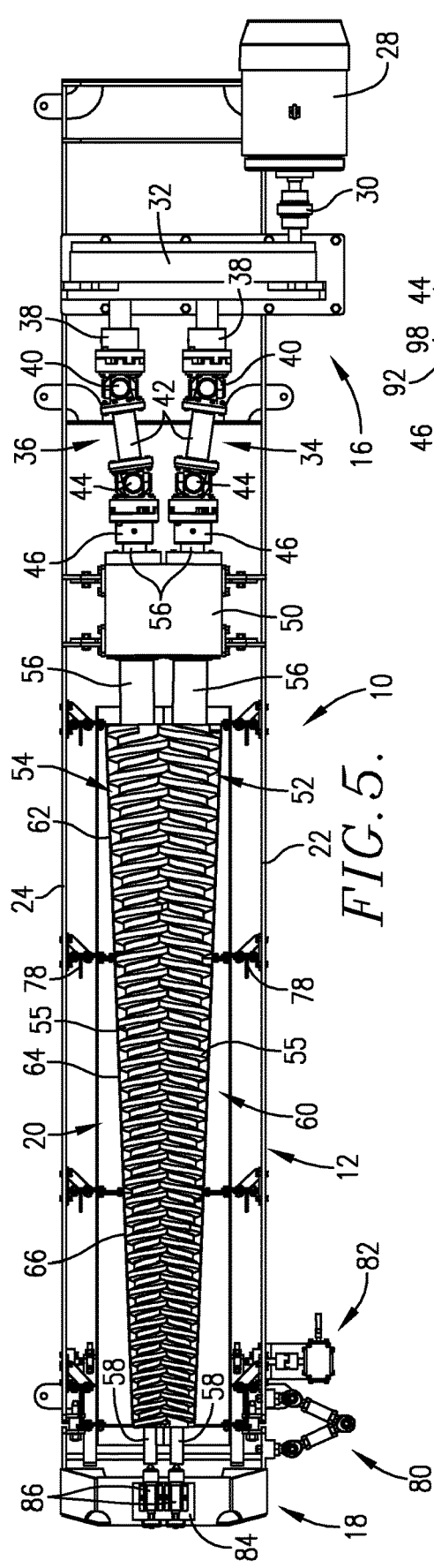
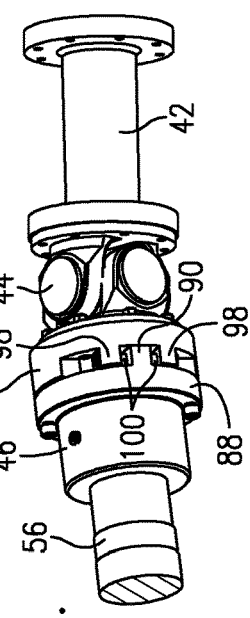
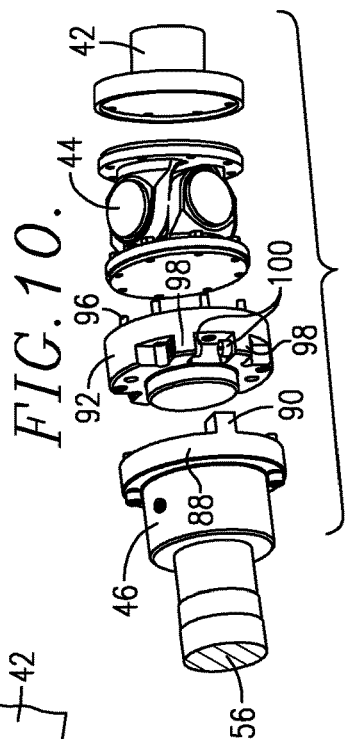
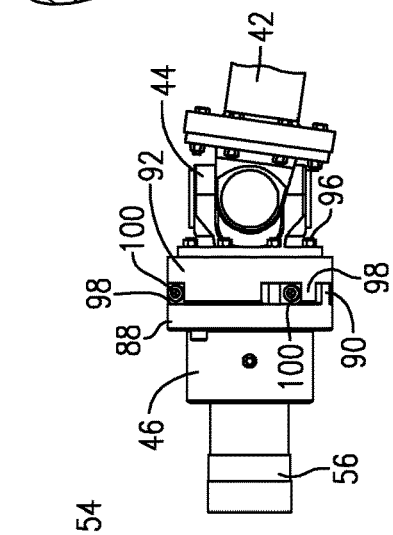
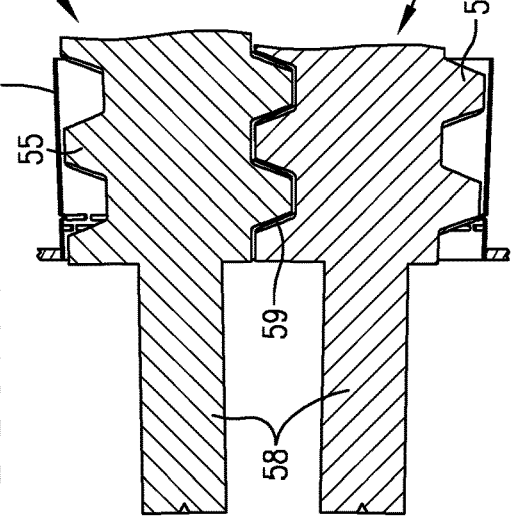
FIG. 5.
FIG. 9.
FIG. 10.
FIG. 8.
FIG. 7.

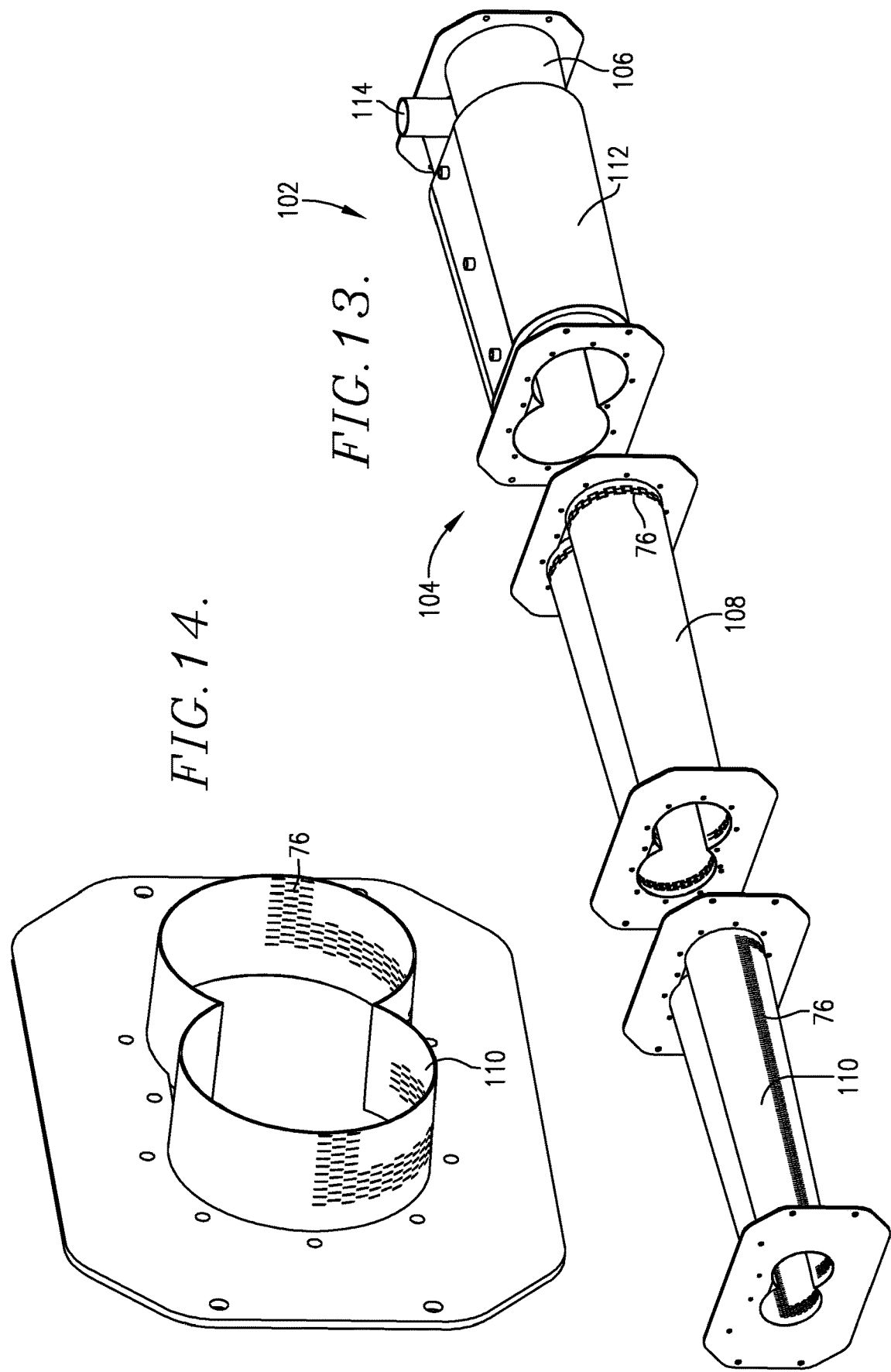

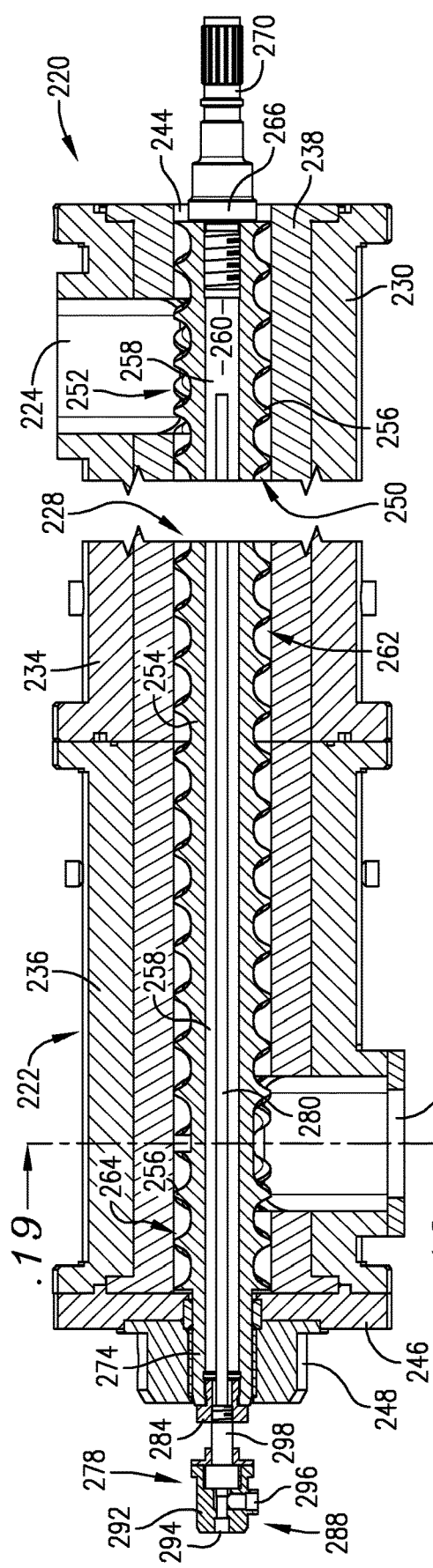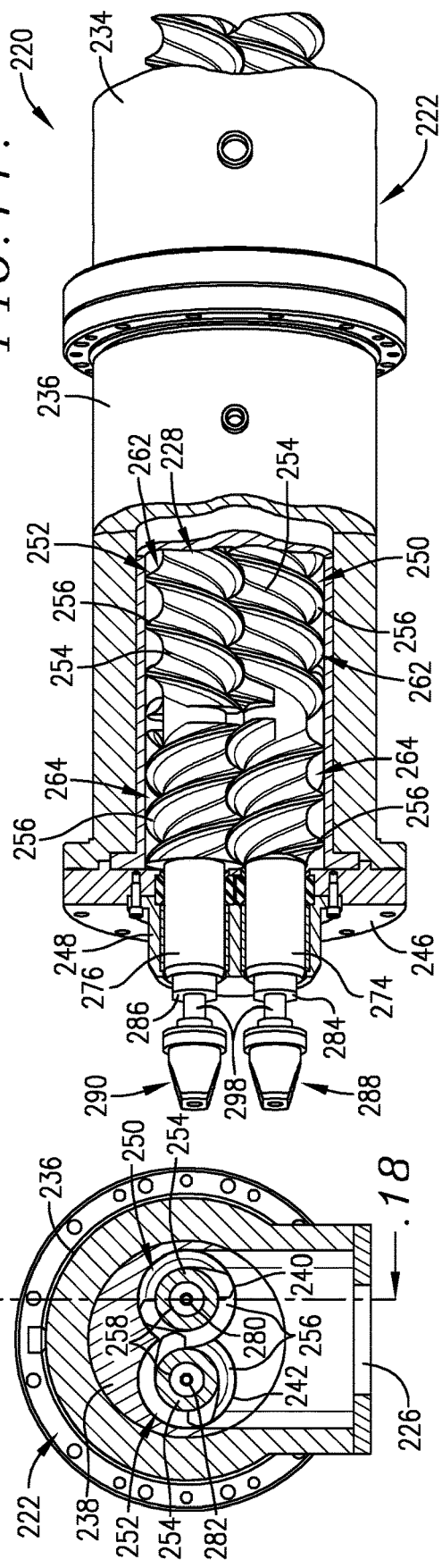

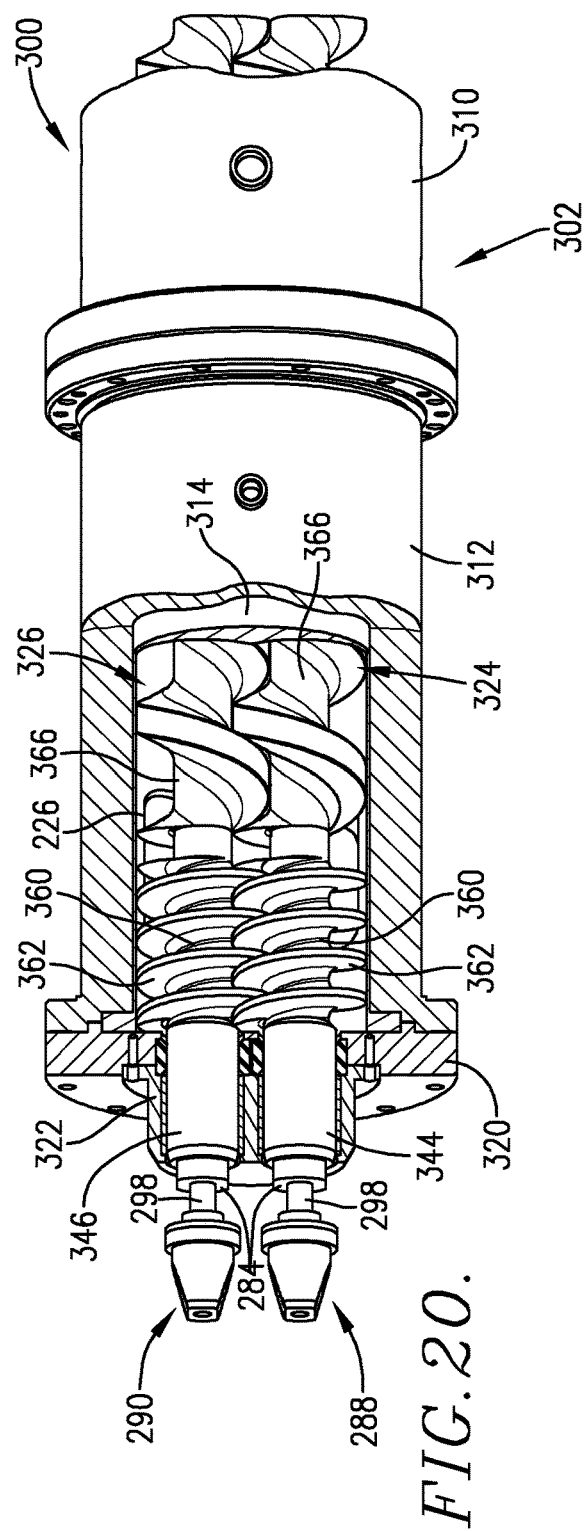
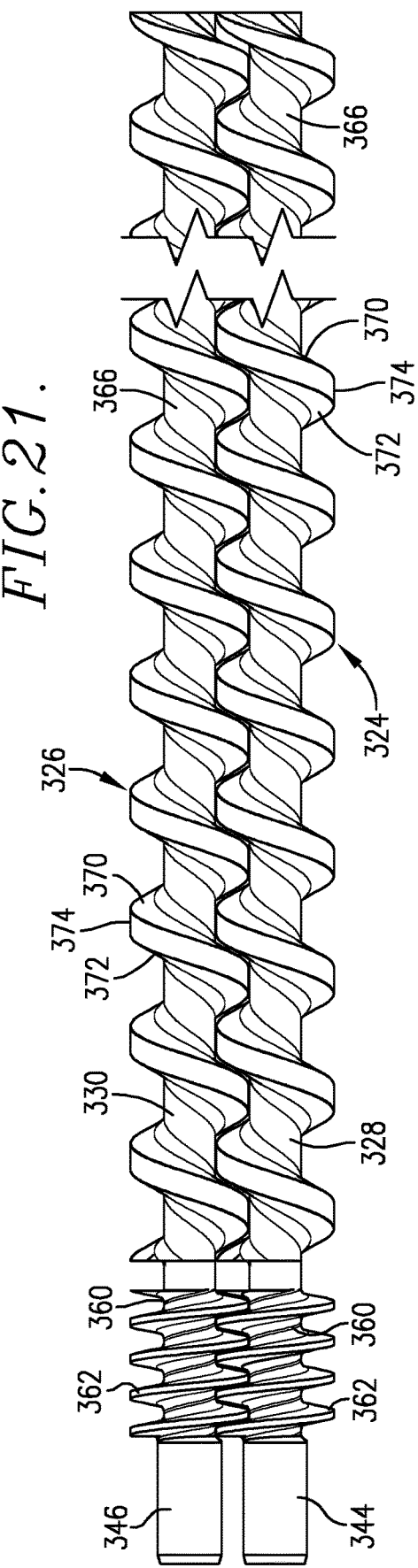
FIG. 20.
FIG. 21.

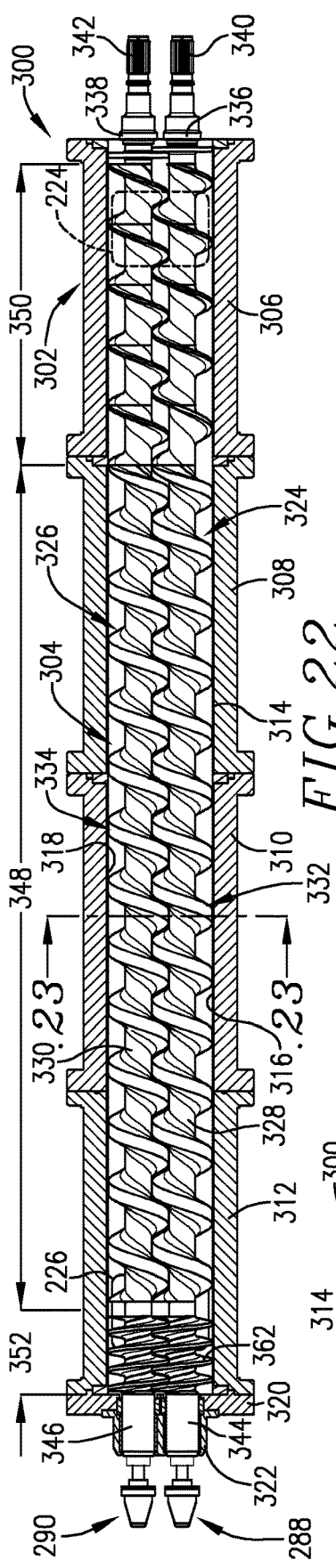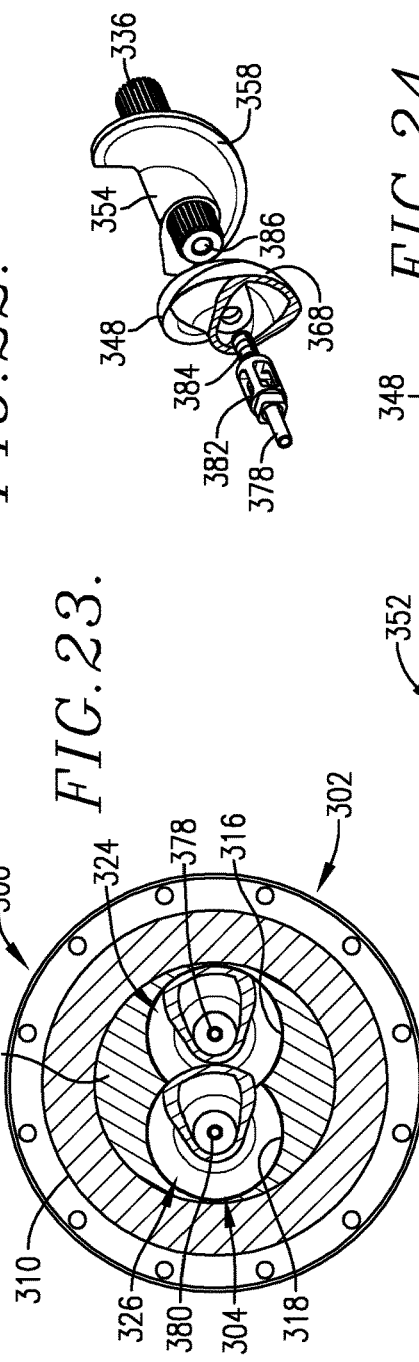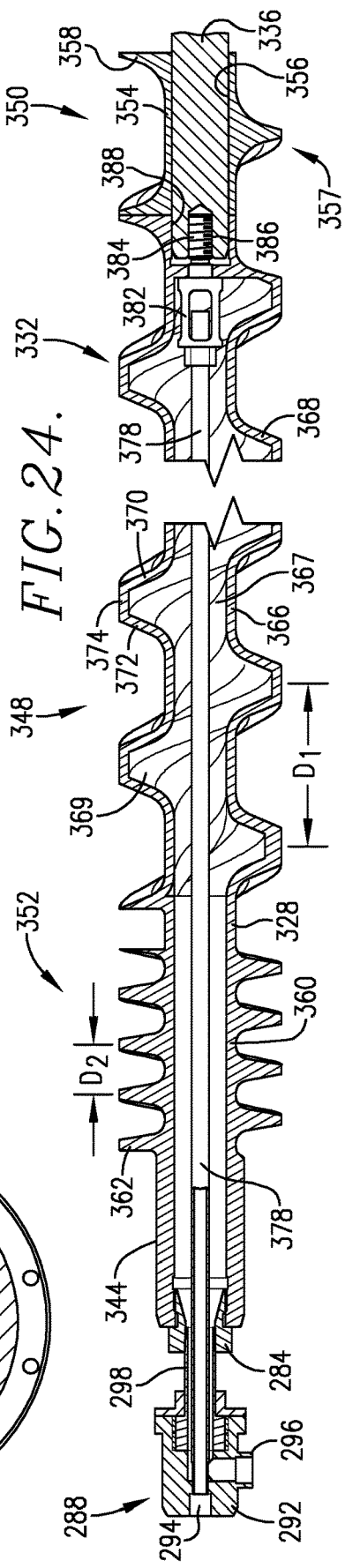

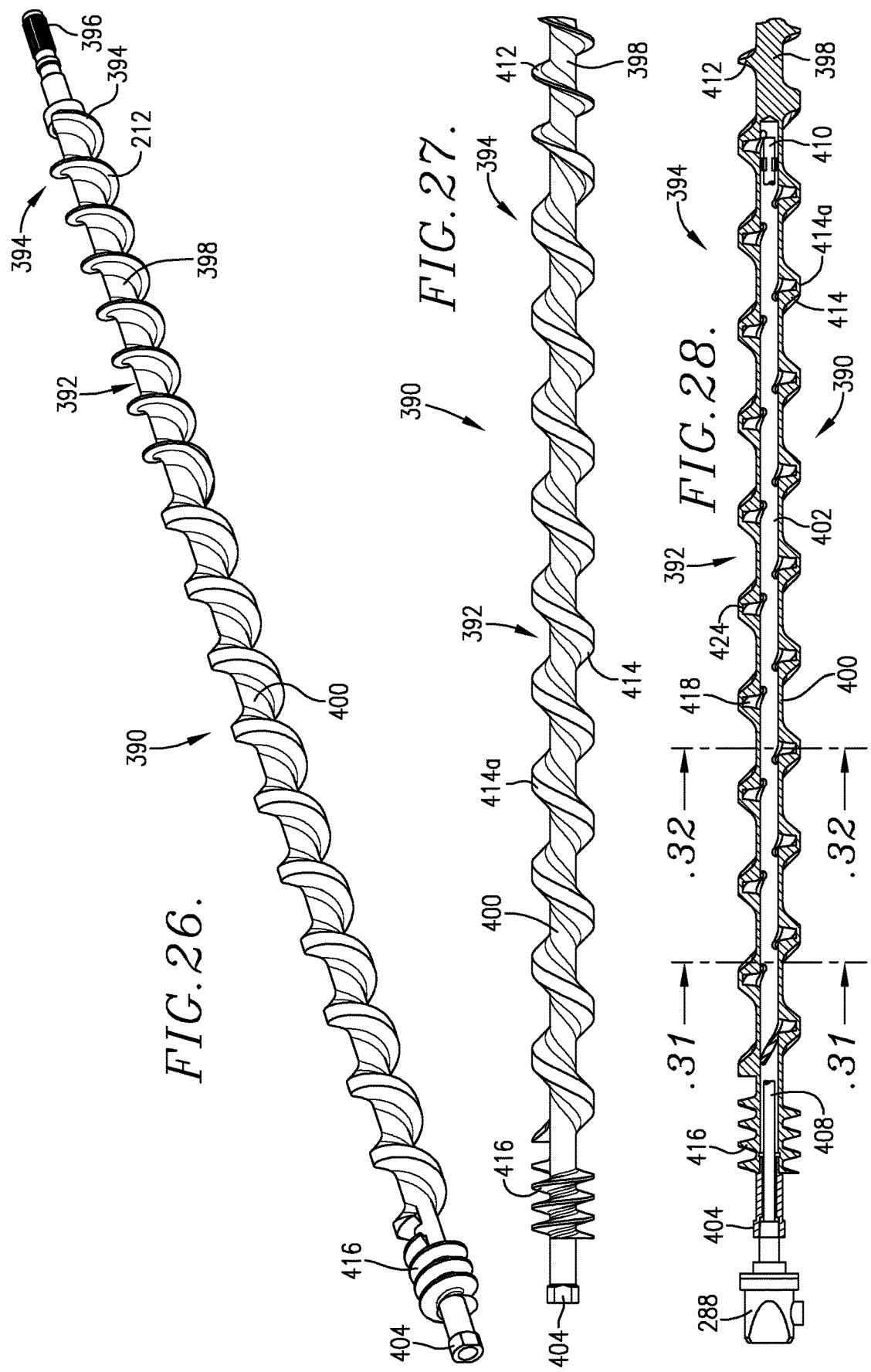

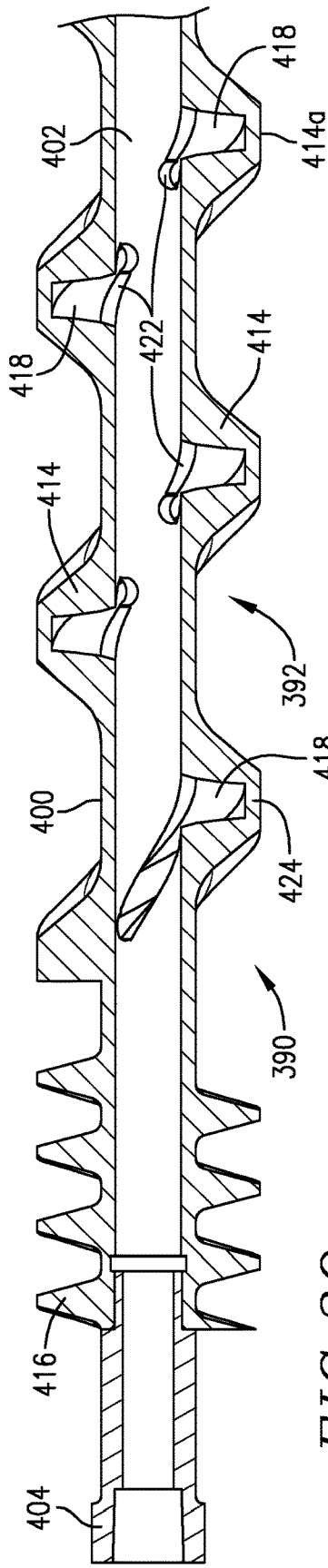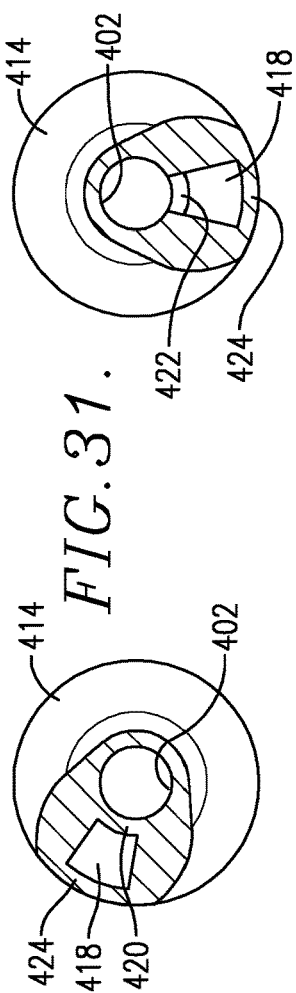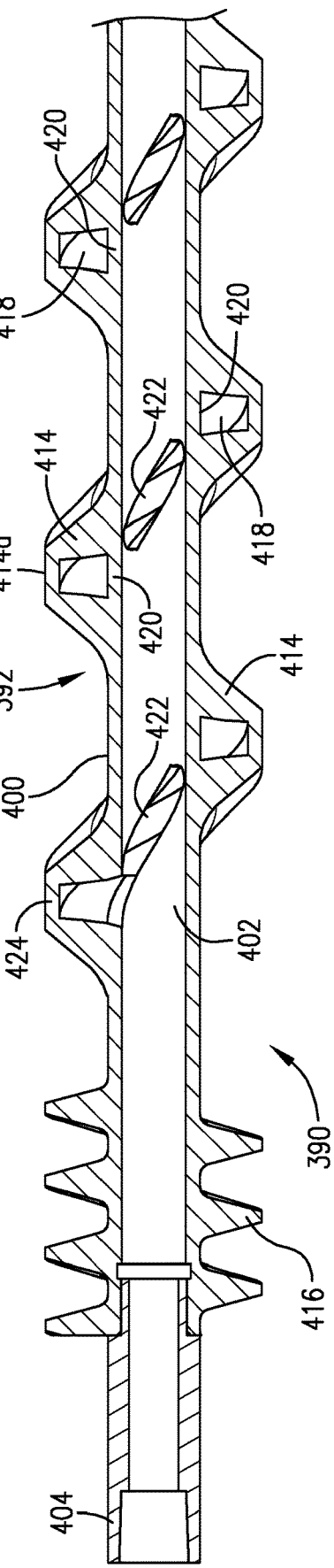

DUAL EXTRUSION METHOD AND APPARATUS FOR PET FOOD PRODUCTION USING MEAT SLURRIES

BACKGROUND OF THE INVENTION

Field of the Invention

The present invention is broadly concerned with methods and apparatus for the preparation of high meat content pet foods, preferably making use of relatively low cost and readily available meat slurries. More particularly, the invention provides dual extrusion methods and corresponding apparatus for the production of such pet foods at commercially significant output rates.

Description of the Prior Art

Manufacturers of high-end pet foods (especially cat and dog foods) desire to incorporate as much meat into their extruded products as possible. Pet owners increasingly favor high natural meat foods, and such products command a premium price in the marketplace. These extruded foods also typically include starch sources, minor ingredients such as vitamins and minerals, a fiber source, and other appropriate ingredients to provide a treat product or a complete nutritional diet. Unfortunately, the meat source used, typically mechanically separated chicken or MSC, is a high moisture source (around 70% moisture); this, in turn, means that only relatively small amounts of MSC can be directly used, because in order to successfully extrude pet foods, the total moisture content of the extrusion mixture usually cannot exceed around 60%, preferably no more than about 45%. Above these moisture levels, it is difficult or impossible to produce extruded foods of acceptable quality. Hence, present-day meat-supplemented extruded pet foods have a maximum meat content of around 40% by weight, based upon the total weight of the food products taken as 100% by weight.

Prior art references dealing with meat-supplemented pet foods include U.S. Pat. Nos. 4,040,768, 5,695,797, 6,238,726, and 6,609,819; US Patent Publications Nos. 2004, 0086616, 2008/0248167, 2012/0237642, 2016/0219904, and 2017/0013848; Foreign Patent Nos. CN105559118A, CN106418615A, CN205528350U, and CN206724651U; and Wenger Manufacturing PowerPoint Presentation entitled "Pet Food Extrusion."

SUMMARY OF THE INVENTION

The present invention overcomes the problems outlined above and provides extruded animal food products containing very high meat contents well above conventional foods. To this end, the invention provides methods for preparing such foods including treatment of emulsified meat (e.g., poultry) to yield a dewatered meat fraction and a liquid fraction. Thereafter, the liquid fraction is initially passed through a mixer, an extruder, and a drying assembly; during or before such passage of the liquid fraction through the mixer, dry feed ingredients are added to the liquid fraction to create an intermediate. This intermediate is then passed through an extruder and a drying assembly to produce an extruded and dried intermediate product comprising the dry feed ingredients and the liquid fraction.

Next, the intermediate product is combined with the dewatered meat fraction, and this mixture is subsequently passed in serial order through a mixer, an extruder, and a drying assembly to create the desired animal food product.

In preferred practice, the methods of the invention are carried out using separate processing systems each including a mixer, an extruder, and a drying assembly. Alternately, the invention can be practiced using only a single such system in a stepwise manner, but this significantly reduces the food production rate and requires an investment in tanks or the like in order temporarily hold the intermediate products.

The invention also provides a dual-system apparatus for the production of high-meat animal food products, comprising first and second processing systems each including, in serial order, a mixer, an extruder, and a drying assembly. The apparatus also has a meat dewatering assembly operable to treat a meat slurry and generate therefrom a dewatered meat cake and a liquid fraction. Respective conduit assemblies associated with the first and second processing systems deliver the meat cake to the preconditioner of the first processing system and deliver the liquid fraction to the preconditioner of the second processing system. Such conduit assemblies also deliver dry feed ingredients to the second processing system preconditioner for mixing therein with the liquid fraction to form an intermediate. This intermediate is then passed through the second processing system extruder and drying assembly to form an extruded intermediate. This intermediate is conveyed to the preconditioner of the first system, for mixing with the incoming dewatered meat fraction. This mixture is then delivered to the second system preconditioner and drying assembly for final processing as the desired food.

The first and second mixers may be in the form of preconditioners or conventional mixers, and the first and second extruders are preferably twin-screw extruders having hollow core screws. The first and second drying assemblies preferably include a pre-dryer and a final dryer.

In another embodiment, improved pet foods can be manufactured by using only the liquid fraction from a meat dewatering device, wherein the liquid fraction is delivered directly to the preconditioner and/or extruder for mixing with dry pet food ingredients. This embodiment does not make use of the meat cake from the dewatering device, in the final pet foods.

BRIEF DESCRIPTION OF THE DRAWINGS

FIG. 3 is a side elevational view of the meat dewatering assembly;

FIG. 4 is a plan view of the meat dewatering assembly;

FIG. 5 is a top view of the meat dewatering assembly, with the screw housing removed to illustrate the configuration of the dual dewatering screws;

FIG. 7 is a sectional view illustrating the forward ends of the intermeshed screws of the meat dewatering assembly, illustrating the nip clearances between the flightings of the screws;

FIG. 8 is an enlarged top view illustrating one of the U-joint/adjustment collars forming a part of the meat dewatering assembly;

FIG. 9 is a perspective view of one of the U-joint/adjustment collars forming a part of the meat dewatering assembly;

FIG. 10 is an exploded view of one of the U-joint/adjustment collars forming a part of the meat dewatering assembly;

FIG. 13 is an exploded view of a modified housing employed in another embodiment of the invention and equipped with a first-section steam heater; and FIG. 14 is a fragmentary perspective view of the third housing section of the embodiment of FIG. 13, illustrating the pattern of drainage slots only on the bottom 180° of the housing section.

FIG. 17 is a fragmentary view with parts broken away of the forward outlet end of the device of FIG. 15, depicting the reverse flight sections of the twin screws;

FIG. 18 is a partial vertical section taken along line 18-18 of FIG. 19, illustrating the internal construction of the processing device;

FIG. 19 is a vertical sectional view taken along line 19-19 of FIG. 18;

FIG. 20 is a fragmentary view with parts broken away of the forward end of another twin-screw processing device in accordance with the invention, depicting the reverse flight sections of the twin screws;

FIG. 21 is a fragmentary view of the twin-screw assembly forming a part of the device of FIG. 20;

FIG. 22 is a sectional view of the device of FIG. 20, illustrating the full configuration of the twin-screw assembly thereof;

FIG. 23 is a vertical sectional view taken along line 23-23 of FIG. 22;

FIG. 24 is a partial sectional view illustrating the hollow shaft/hollow helix construction of the twin screws of the device of FIG. 15;

FIG. 25 is a fragmentary, perspective, exploded view illustrating the drive connection and steam diffuser forming a part of the twin-screw assembly of the FIG. 20 embodiment;

FIG. 26 is a perspective view of another hollow core screw embodiment in accordance with the invention;

FIG. 27 is a fragmentary elevational view of the screw of FIG. 26;

FIG. 28 is a fragmentary, vertical sectional view of the screw of FIG. 26, illustrating the internal construction thereof;

FIG. 29 is a fragmentary, enlarged cross-sectional view of the screw of FIG. 26;

FIG. 30 is another fragmentary, enlarged cross-sectional view of the screw of FIG. 26;

FIG. 31 is a vertical sectional view taken along the line 31-31 of FIG. 28;

FIG. 32 is a vertical sectional view taken along the line 32-32 of FIG. 28;

While the drawings do not necessarily provide exact dimensions or tolerances for the illustrated components or structures, FIGS. 1-32 are to scale with respect to the relationships between the components of the structures illustrated therein.

DETAILED DESCRIPTION OF THE PREFERRED EMBODIMENT

The Meat Dewatering Assembly

Figure 1:
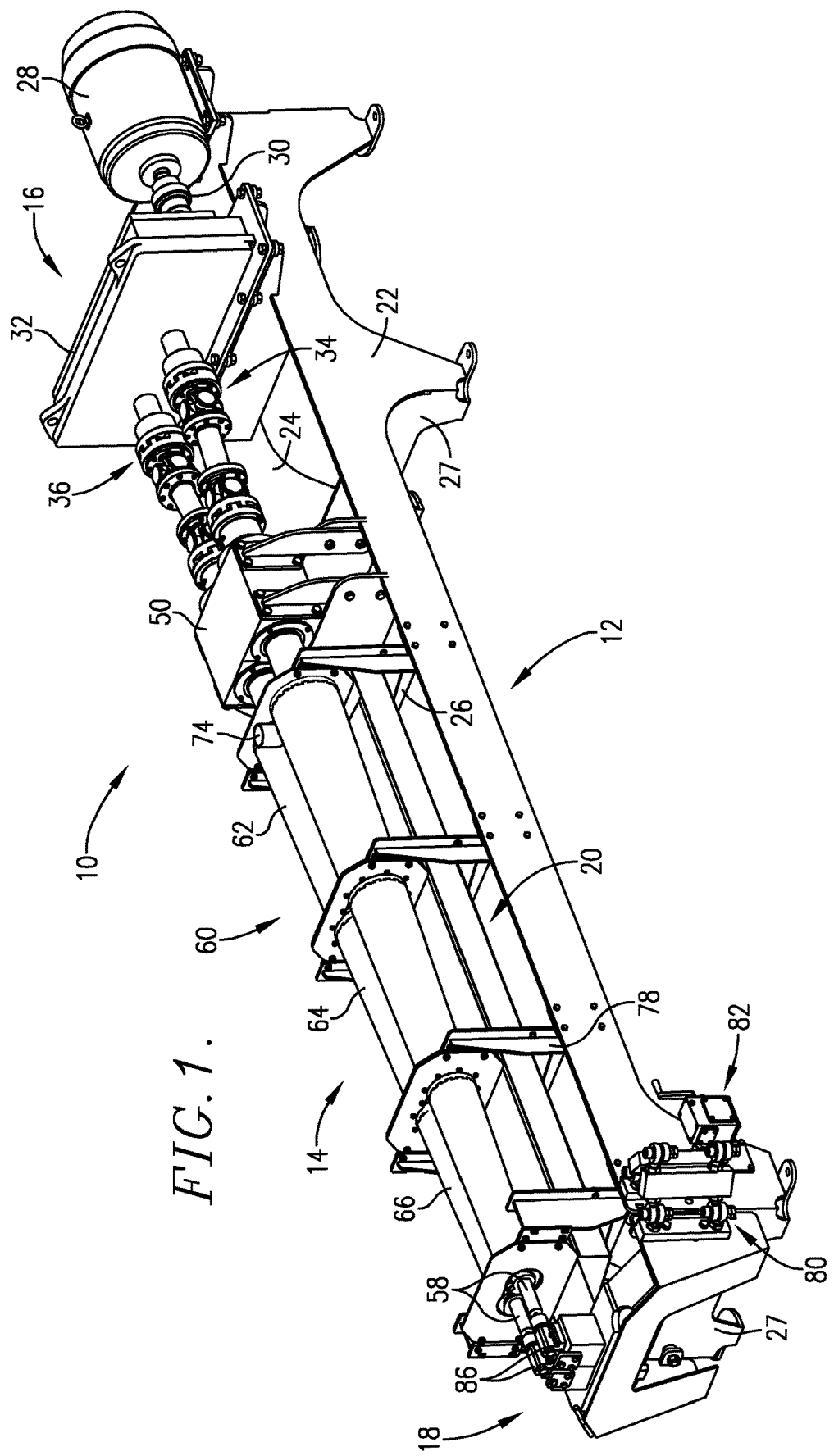
FIG. 1 is a perspective view of a meat dewatering assembly in accordance with the invention.
Figure 2:
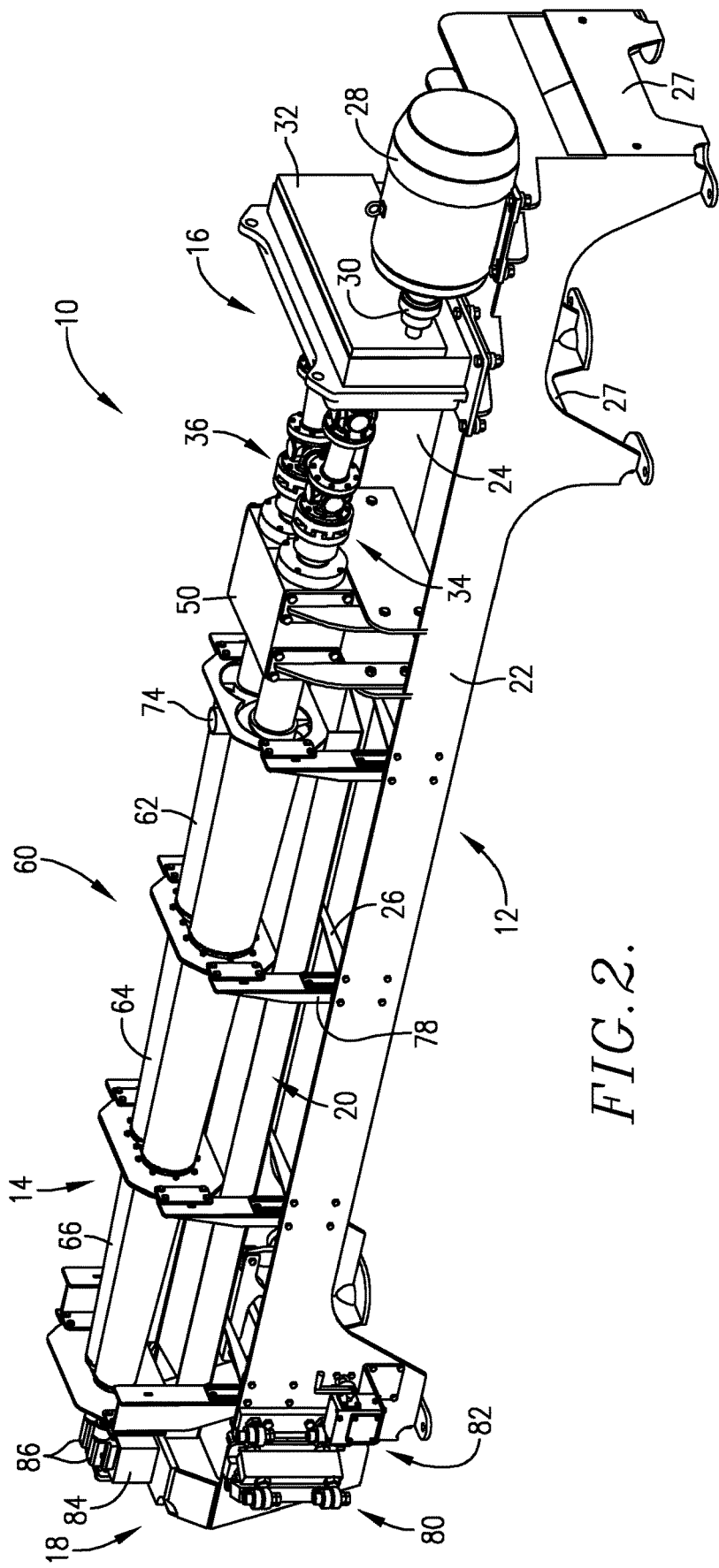
FIG. 2 is another perspective view of the meat dewatering assembly, from a different viewing angle.

Turning first to FIGS. 1-4, a meat dewatering assembly 10 is depicted, which generally includes an elongated bottom support frame 12, a twin-screw dewatering unit 14, a drive assembly 16 operably coupled with unit 14, an endmost, swingable screw support 18, and a water collection trough 20. As illustrated, the frame 12 supports all of the foregoing components in an in-line manner, from right to left, as viewed in FIGS. 1, 3, and 4.

In more detail, the support frame 12 has elongated, laterally spaced apart side members 22, 24, with intermediate connection structure 26 and spanning walls 27 extending between and interconnecting the side members. The drive assembly 16 includes an electric drive motor 28 having an output shaft 30 leading to gearbox 32. The gearbox 32 has a pair of output shaft assemblies 34, 36, each including a first adjustment collar 38, a first interconnected U-joint 40, a short output shaft 42 from the first U-joint 40 to a second U-joint 44, and a second adjustable collar 46.

The dewatering unit 14 includes a pair of uniformly tapered, non-parallel, intermeshed, helically flighted screws 52 and 54 each having a central flighted region 55, rearwardly extending drive section 56 extending into and supported within bearing housing 50, and forwardly extending stub shafts 58. As illustrated, the drive section 56 extends through the bearing housing 50 and is secured to adjustable collar 46. In the illustrated embodiment, the center lines of the screws 52, 54 have an included angle of 2° therebetween; more broadly, this angle would be from about 1-7°, more preferably from about 1-5°. Greater included angles of 10° or more would tend to degrade the performance of the assembly 10 by creating unduly high nip pressure conditions at the nip regions between the screws. The regions 55 of the screws 52, 54 are of single flight design, with a uniformly decreasing pitch length from rear to front, and a uniformly varying flight depth from rear to front. The screw 52 is a left-hand lead, variable lead (from 3.937 in. at the rear end to 2.520 in. at the forward end), variable depth screw, whereas the screw 54 is a right-hand lead, variable pitch, variable depth screw having the same lead dimensions. Pinch points or nip clearances 59 are provided between the intermeshed flights along the length of the screws, which are adjustable in length. Importantly, the screws are designed and powered to rotate in a counter-rotating fashion, i.e., they rotate in opposite clock directions.

The nip clearances 59 between the intermeshed flighting of the screws 52, 54 (see FIG. 7) can be varied using the adjustment structure described below between 0 and 0.161 inches at the large diameter ends of the screws, and from 0 to 0.086 inches at the small diameter ends of the screws. In alternate designs, multiple helix screws may be used in lieu of the screws 52, 54, or the screws could be of constant lead or constant pitch.

Figure 6:
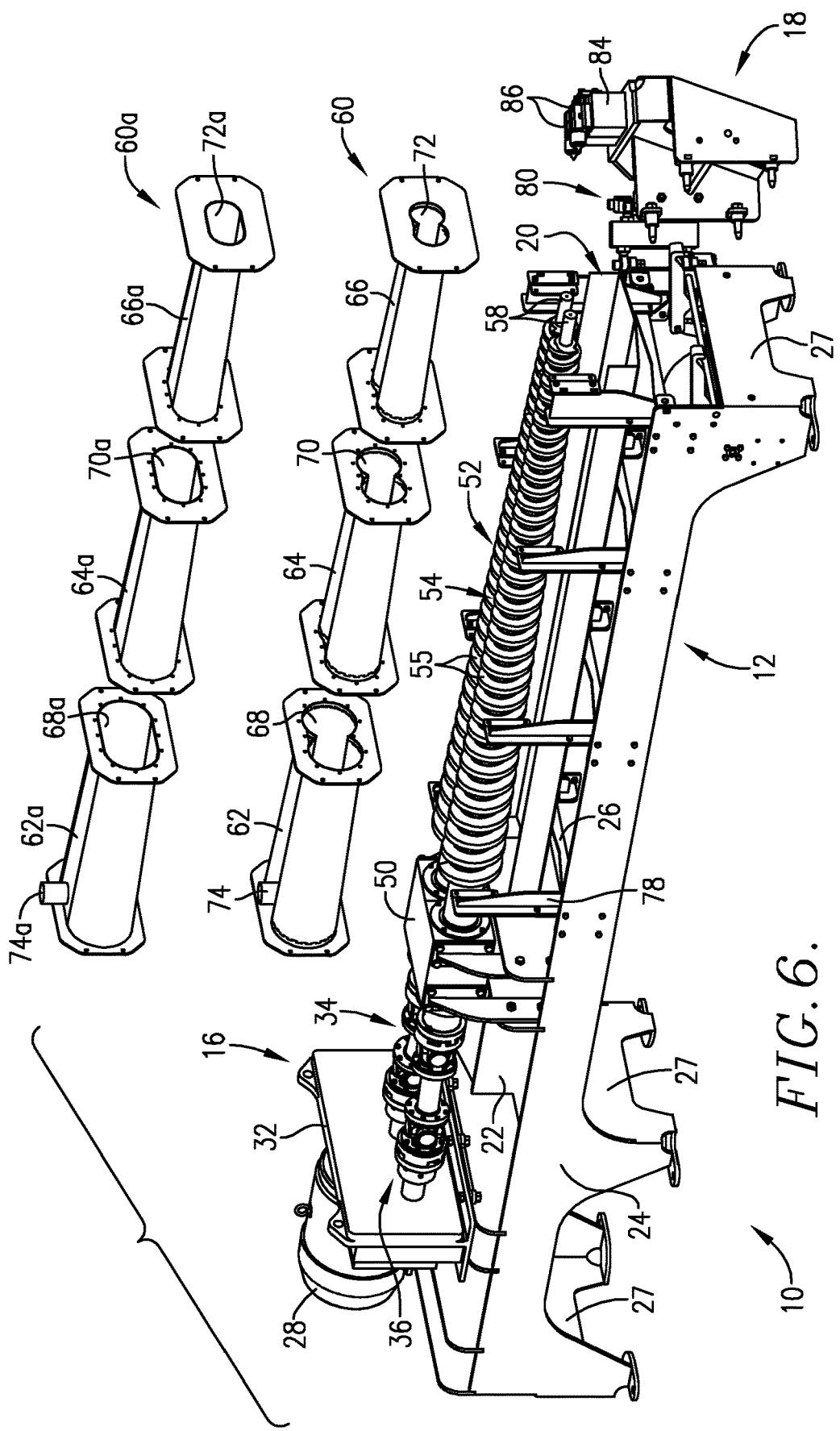
FIG. 6 is a perspective exploded view of the meat dewatering assembly, illustrating alternate housing assemblies and the endmost screw support frame in its open position.
Figure 11:
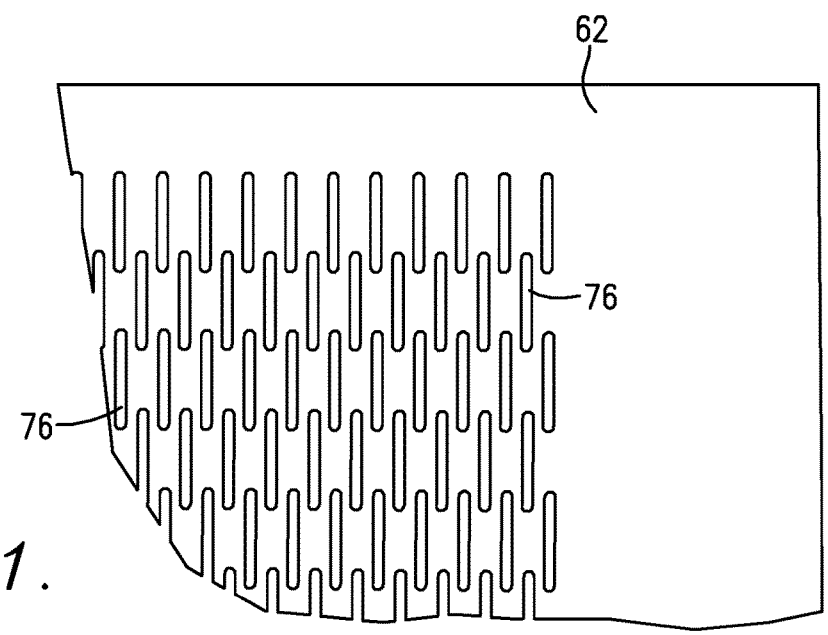
FIG. 11 is a fragmentary view illustrating the water expression slots in the housing of the meat dewatering assembly.
Figure 12:
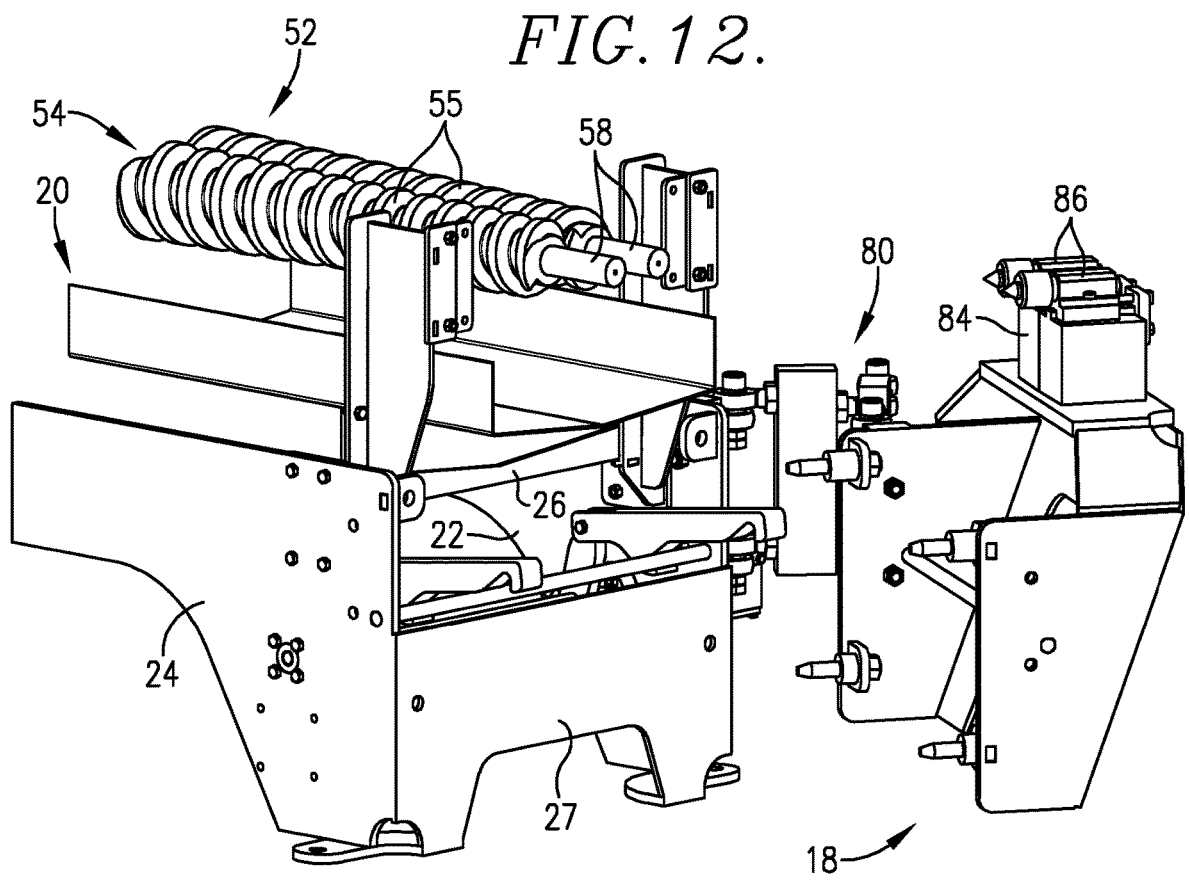
FIG. 12 is an enlarged view similar to that of FIG. 6, but illustrating in detail the swing frame screw support of the meat dewatering assembly.
Figure 15:
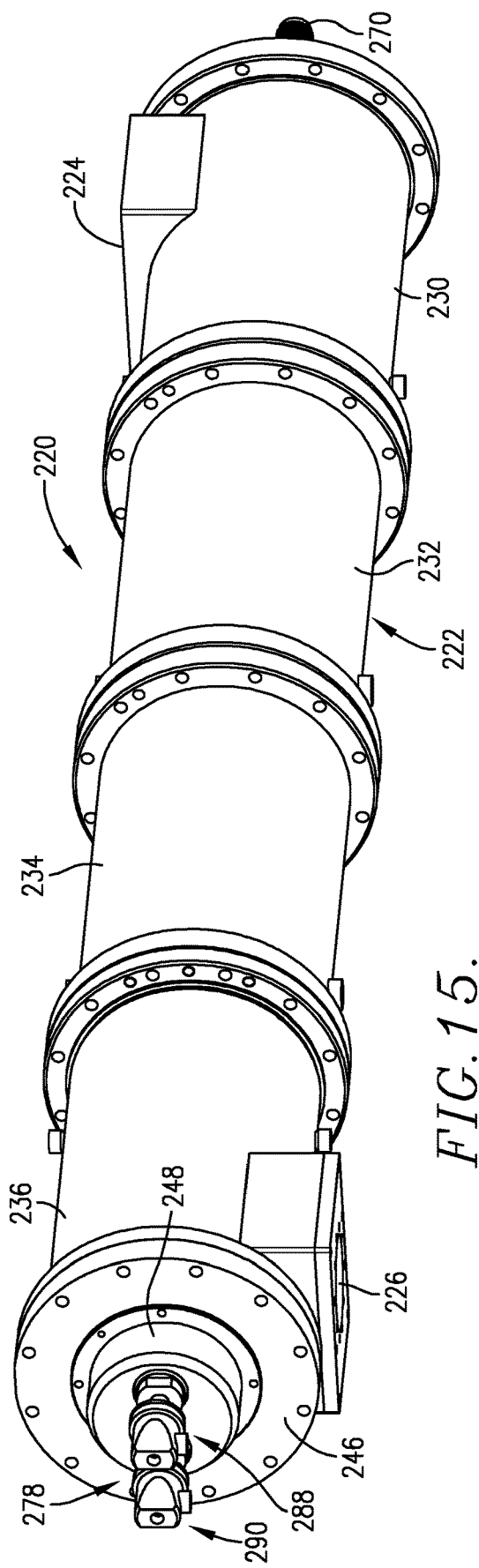
FIG. 15 is a perspective view of a twin-screw processing device in accordance with the invention.

The overall unit 14 also includes a perforated, open-ended housing assembly 60, which receives the screws 52, 54, with the drive section 56 extending rearwardly from the housing, and the stub shafts 58 extending forwardly therefrom. As best seen in FIG. 6, the housing assembly 60 is made up of three end-to-end interconnected and tapered sections 62, 64, 66, with each having an internal bore 68, 70, 72 of somewhat "figure-8" configuration so as to closely surround the intercalated screws 52, 54, i.e., the housing presents two elongated, side-by-side, communicating chambers, each surrounding and receiving a corresponding screw 52 or 54. The rearmost housing section 62 is equipped with a tubular meat inlet 74. The sections 62-66 have a series of elongated, water drainage slots 76 formed therein. In this embodiment, the slots 76 in section 62 are 1 mm in width and 9 mm in length; the slots 76 in the downstream sections 64 and 66 are smaller, with the slots of section 64 greater than those of section 66. Also, in the embodiments of FIGS. 1-12, the slots 76 are provided about the entirety of the housing 60 and along the full length thereof. As best seen in FIGS. 1 and 3, a series of upright mounts 78 are secured to the side members 22, 24, and extend upwardly for connection to the housing sections, thereby suspending the housing 60 above the support frame 12. The open housing design ensures that the meat dewatering operation of the assembly 10 occurs at substantially atmospheric pressures in contrast to typical extruders which normally operate at superatmospheric pressures.

As depicted in FIG. 6, use may be made of an alternate housing assembly 60*a*, which is identical to the assembly 60 except that the bores 68*a*, 70*a*, and 72*a* have essentially flat intermediate sections and rounded ends. Consequently, the walls of the housing sections 62*a*, 64*a*, and 66*a* do not closely conform to the configuration of the screws 52, 54 at the intermeshed regions thereof.

The swingable screw support 18 is mounted to the forward end of support frame 12 by means of a pivot assembly 80, allowing the support 18 to be selectively moved from a closed position, illustrated in FIGS. 1-5, to an open position, illustrated in FIG. 6. Appropriate latching structure (see FIGS. 6 and 12) is provided to hold the support 18 in its closed position, with an attach/detach crank 82. When it is desired to open the support, the crank 82 is actuated, and the support is swung outwardly to the FIG. 6 position. The support 18 is provided with a fixture 84 having a pair of side-by-side bearing supports 86, which receive the forwardly projecting stub shafts 58 of the screw 52, 54; thus, the screws are supported at both ends thereof during operation of the assembly 10.

The water collection trough 20 positioned under housing 60 is of generally U-shaped configuration and is designed to receive water expressed through the housing slots 76. Suitable water take-away structure (not shown) is provided for draining of the trough 20 during operation of the assembly 10.

As indicated previously, the nip clearances between the screws 52, 54 can be varied. In order to do this, use is made of one or more of the adjustment collars 38. Referring to FIGS. 8-10, the adjustment collar/U-joint 46/44 is illustrated. Specifically, the rearmost end of drive section 56 of screw 54 is secured to the collar 46. The collar 46 has a first radially expanded segment 88 having a pair of opposed lugs 90. The collar 46 also has a second segment 92 having a pair of opposed lug-receiving recesses 94. The segment 92 is secured to U-joint 44 by means of screws 96. The recesses 94 are defined by a pair of projections 98, each carrying an adjustment screw 100; the screws 100 engage the lugs 90 as shown. When it is desired to change the relative position of the screw 54 relative to the screw 52, and thereby change the nip clearances therebetween, it is only necessary to turn one of the adjustment screws 100, which affects a slight rotation of the collar 46, and thereby the entirety of the screw 54. Of course, such adjustments can only be made when the assembly 10 is not in operation.

FIG. 13 illustrates a modified embodiment in the form of a meat dewatering assembly 102. In this embodiment, a screw assembly housing 104 is provided made up of first, second, and third end-to-end interconnected housing sections 106, 108, and 110. The initial housing section 106 is equipped with a surrounding steam-heating jacket 112, which serves to heat the emulsified meat introduced through the inlet 114. Moreover, in this embodiment, the intermediate housing section 108 is equipped with water-drainage slots 76, which cover the full surface area of the section 108. The final section 110 has slots 76 only on the bottom half thereof, as best seen in FIG. 14.

It is desirable that meat to be processed in the assembly 10 be first mechanically conditioned into an emulsified form, which may be optionally preheated to a temperature of from about 50-90° C., before delivery to the inlet 74. The meat then passes along the length of the housing 60 during counter-rotation of the screws 52, 54, the latter powered by means of drive assembly 16. As the meat traverses the length of the housing at substantially atmospheric pressures, the intermeshed screws serve to press or squeeze the meat particles within the emulsified meat, to thereby expel water and other liquids which may contain some soluble materials through the housing slots 76 for collection within and take-away from trough 20. The dewatered meat then passes through the open forward end of the housing 60 where it is collected, by a suitable conveyor or other apparatus (not shown) separately from the expressed water. In normal practice, the screws 52, 54 are counter-rotated at a speed of from about 30-200 rpm, more preferably 50-150 rpm, which differs from typical twin-screw extruders equipped with high rotational speed, co-rotating screws.

The Hollow Core Screw Extruder

Turning now to the drawings, and particularly FIGS. 15-19, a processing device 220 is illustrated. Broadly speaking, the device 220 includes an elongated, tubular barrel 222 having a material inlet 224 and an opposed processed material outlet 226, with a twin-screw assembly 228 within the barrel 222.

As illustrated, the barrel is made up of a plurality of end-to-end interconnected barrel sections 230, 232, 234, and 236. An internal liner assembly 238 is located within and extends along the length of the sections 230-236 and presents a pair of elongated, juxtaposed communicating arcuate passageways 240, 242, which receive the twin-screw assembly 228. The sleeve further presents the rearmost opening 244, as best seen in FIG. 18. An apertured front wall 246 is located at the opposite end of the barrel and is secured thereto. Additionally, a forwardly projecting bearing housing 248 is attached to the outer face of front wall 246, and has a pair of side-by-side tubular bearings therein.

Figure 16:
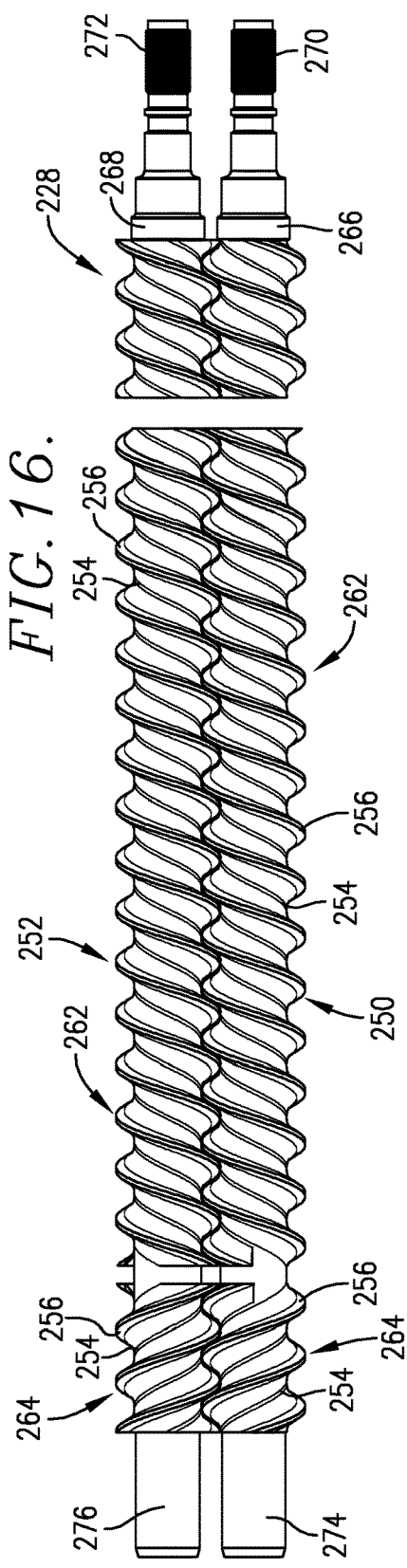
FIG. 16 is a fragmentary view of the twin-screw assembly forming a part of the device of FIG. 15.

The twin-screw assembly 228 includes identical, complemental first and second intermeshing, double-flight screws 250 and 252, which are designed to directionally co-rotate during the operation of device 220. Referring to FIGS. 16 and 18, it will be seen that the screws 250, 252 each have an elongated shaft 254 with outwardly extending, helical flighting 256 along the length of the shaft 254, having a pitch length of 1, based upon the screw diameter. An elongated central bore 258 extends substantially throughout the length of the shaft 254, thereby creating a hollow core 260 therein. As best seen in FIG. 17, the fighting 256 is divided into two sections, namely a first section 262 operable to convey material from the inlet 224 toward and through the processed material outlet 226, and a second section 264 operable to retard the flow of material therepast. To this end, the flighting sections 262, 264 are of reverse hand, respectively. The rearmost ends of the screws 250, 252 are provided with drive and bearing structure 266, 268, having rearmost, splined connector ends 270, 272; the ends 270, 272 are designed to mate with suitable drive structure (not shown) for axially rotating the screws. The forward ends of the screws are equipped with elongated extensions 274, 276, which are received within the tubular bearings of housing 248 (FIG. 17).

The screws 250, 252 are equipped with structure 278 to supply heat exchange media to the internal cores thereof. Specifically, elongated, stationary steam delivery tubes 280 and 282 extend from a point outside of housing 222 adjacent front wall 246 and into the bores 258. The tubes 280, 282 extend through the endmost tubular fixtures 284, 286 located at the forward ends of the extensions 274, 276. The outermost ends of the tubes 280, 282 connect with identical rotary unions 288, 290. Each such union includes a block 292 having a media inlet opening 294, a liquid removal outlet 296, and a rotatable sleeve 298 disposed about the corresponding tube 280 or 282. To this end, the sleeves 298 are secured to the corresponding tubular fixtures 284, 286.

The screws 250, 252 are preferably fabricated from metal using normal machining techniques and are normally case-hardened.

In operation, material to be processed (which may be preconditioned, as explained hereafter) is delivered to inlet 224 during co-rotation of the screws 250, 252, which serves to advance the material during processing thereof to deliver processed material to outlet 226. During this operation, heat exchange media (normally steam) is directed from a delivery conduit (not shown) coupled with the media inlets 294 and into the tubes 280, 282 to the open cores 260 of the screws in order to provide thermal energy required for processing of the material. Additional energy input is provided by means of pressure and shear conditions developed within the barrel 222. During processing, steam condensate passes from the cores 260 and through the sleeves 298, exiting the system via the removal outlets 296. In order to prevent leakage of material past the wall 246 and the fixtures 284, 286, the reverse flight section 264 comes into play by creating a retardation force against the flow of material created by the opposite hand fighting of the section 262. The product emerging from the outlet 226 may then be passed through a restricted orifice extrusion die and cut, in order to form the final product, although in practice, the elongated delivery pipe is normally secured to the outlet 226 and a final die and knife assembly are located at the opposite end of the pipe.

FIGS. 20-25 illustrate another embodiment of the invention, in the form of a processing device 300. The device 300 is in many respects similar to the device 220, having a tubular barrel 302 with a twin-screw assembly 304 therein, and having an inlet 224 and an outlet 226, as in the case of the first embodiment. Again, the barrel 302 is made up of tubular, interconnected barrel sections 306-312 with an internal liner assembly 314 defining side-by-side passageways 316, 318. The forward end of barrel 302 is equipped with a front wall 320, which supports a forwardly projecting bearing housing 322.

The screw assembly 304 has a pair of identical, intermeshed, single flight, helical screws 324, 326, which are received within the passageways 316, 318. Each of the screws has an elongated central shaft 328, 330, as well as outwardly extending helical flighting 332, 334 along the length thereof. As in the case of the first embodiment, the screws 324, 326 have rearmost drive and bearing structures 336, 338, equipped with splined drive connection ends 340, 342. The forward ends of the screws have bearing extensions 344, 346, which are received within the bearings of housing 322.

The principal differences between the first and second embodiments are the configuration of the helical screws 324 and 326. Specifically, each such screw includes a primary central section 348 operable to move product along the length of the barrel 302 towards and through the outlet 226, an inlet section 350 operable to deliver incoming material to the section 348, and a forward, material flow retarding section 352. The inlet section 350 is advantageously a machined part having a central shaft 354 with an internally splined bore 356, and outwardly extending fighting 332, 334. As best seen in FIG. 24, the bore 356 is designed to receive the forward end of the corresponding drive and bearing structure 336, 338. The screw sections 348 and 350 have a pitch length of 1, based upon the screw diameter, and denoted by D1 of FIG. 24. The forward section 352 of each screw is likewise a machined part and has a central, bored shaft 360 with outwardly extending helical flighting 362. Notably, the pitch of the flight 362 is opposite that of the pitch of the flighting 358 of screw section 348, and has a pitch length of 0.3, based upon the screw diameter, denoted by D2 of FIG. 24. Preferably, the pitch length D1 should be from about 0.4-1.5, more preferably 0.5-1.0, whereas the pitch length D2 should be from about 0.2-1.1, more preferably 0.3-1.

The central section 348 is preferably formed by casting (e.g., sand or investment casting) with a plurality of sections which are butt-welded together to form the entirety of the central section. As best seen in FIG. 24, the central section 348 has a central shaft 366, which is hollow along the length thereof to define a central core 367, as well as outwardly extending flighting 368, which is likewise hollow to define a helical core 369. In this regard, the flight 368 is defined by outwardly extending, opposed, spaced apart sidewalls 370 and 372, with a flattened outer wall 374. As such, it will be observed that there is a helical transition 376 between the innermost ends of the sidewalls 370, 372, which provides full, open communication between the central core 367 and the helical core 369, without any blockage or narrowing whatsoever; stated otherwise, the transition 376 presents an area which is open throughout the length and width thereof in order to afford unobstructed communication between the hollow regions of the shaft and helical screw. Inasmuch as the section 348 is of cast construction, it will be seen that the thickness of the shaft 366 is essentially identical with the thicknesses of the sidewalls 370, 372, and outer wall 374.

In preferred forms, the length of the central screw section 348 is at least about three times, more preferably at least about five times, greater than the length of the forward screw section 352.

The screws 324, 326 receive elongated media delivery tubes 378, 380, which are designed to deliver media such as steam to the interior of the screw sections 348 and 352. The forward ends of the tubes 378, 380 are received within rotary unions 288, 290, identical to those described in connection with the first embodiment, and like reference numerals have been applied (FIG. 24). The rotatable sleeves 298 are supported by couplers 284, again as described in the first embodiment.

The innermost ends of the tubes 378, 380 are each supported by a tubular, open-sided diffusion cage 382. The latter includes a mounting screw 384, which extends through the end of the primary screw section 348 and is received within a threaded bore 386 in the forward butt end of bearing and drive structure 336.

The rearmost end of the screw section 348 has a splined portion 388, which receives the forward end of the structure 336 ahead of inlet screw section 350. The forward end of the screw section 348 is secured to the rearward end of screw section 352 by butt welding or any other appropriate technique. Hence, driving rotation of the structures 336 serves to rotate the entire screws 324, 326.

The operation of device 300 is similar to the device 220. However, owing to the completely open hollow core structure of the screw section 348, better heat transfer from the injected steam is afforded, as compared with the device 220.

FIGS. 26-32 illustrate another hollow core screw embodiment of the invention in the form of helical extrusion screw 390. The screw 390 is designed for use in a twin-screw extruder so that a mating screw (not shown) will be used in conjunction with the screw 390 to make a screw set. Generally, the screw 390 includes an elongated central shaft 392 with a continuous helical fighting 394 along the length thereof.

The shaft 392 has a rearmost splined section 396 to afford a driving connection with a motor/gear reducer assembly and a forward bearing extension. The shaft 392 is a machined, case-hardened part and has a solid rear section 398 and a hollow core forward section 400 presenting an elongated, axially extending, central core 402. The forward end of the core 402 is equipped with a coupler 404 designed to receive a rotary union 288 (FIG. 28). A stationary steam delivery tube 408 (shown fragmentarily in FIG. 28) extends substantially the full length of the core 402 and has an open end 410.

The fighting 394 includes a rear section 412 of relatively narrow flight width, which extends the full length of the solid section 398. Additionally, the fighting 394 has a wider flight width forward section 414 presenting an outermost flight surface 414a, which extends from the end of section 412 to a point close to the forward end of the shaft 392. However, as in the case of the earlier embodiments, the screw 390 has a reverse flight section 416 between the end of section 414 and coupler 404.

In the manufacture of the screw 390, the fighting 394 is machined as a solid protrusion from the shaft 392, with a continuous, helical, open-top groove 418 in the wide flight section 414, extending from the outermost flight surface 414a inwardly to an inner wall 420 close to the core 402. Thereafter, a series of spaced apart apertures 422 are formed along the length of the inner wall 420, in order to communicate the core 402 with groove 418. Next, a helical cover piece 424 is positioned over the upper end of the groove 418, and is welded to the fighting section 414. In the final step, the screw 390 is machined to provide the proper outside diameter for the flighting 394. This creates a unitary construction, as illustrated in the drawings.

The operation of the screw 390, with its mating, intermeshed screw within an extruder barrel, such as barrel 222, is the same as described in connection with the embodiment of FIGS. 15-19. That is, co-rotation of the screw set serves to advance material during processing thereof from the barrel inlet to the barrel outlet. Simultaneously, steam or other heat exchange media is directed into the core 402 through the union 288 and the extension of shaft 392 beyond the end of the extruder barrel. This media flows through the core 402 and groove 418 owing to the communicating apertures 422. This provides an increased level of thermal energy to the process. The reverse flight section 416 also serves to retard the flow of material at the forward end of the screw 390.

Figure 33:
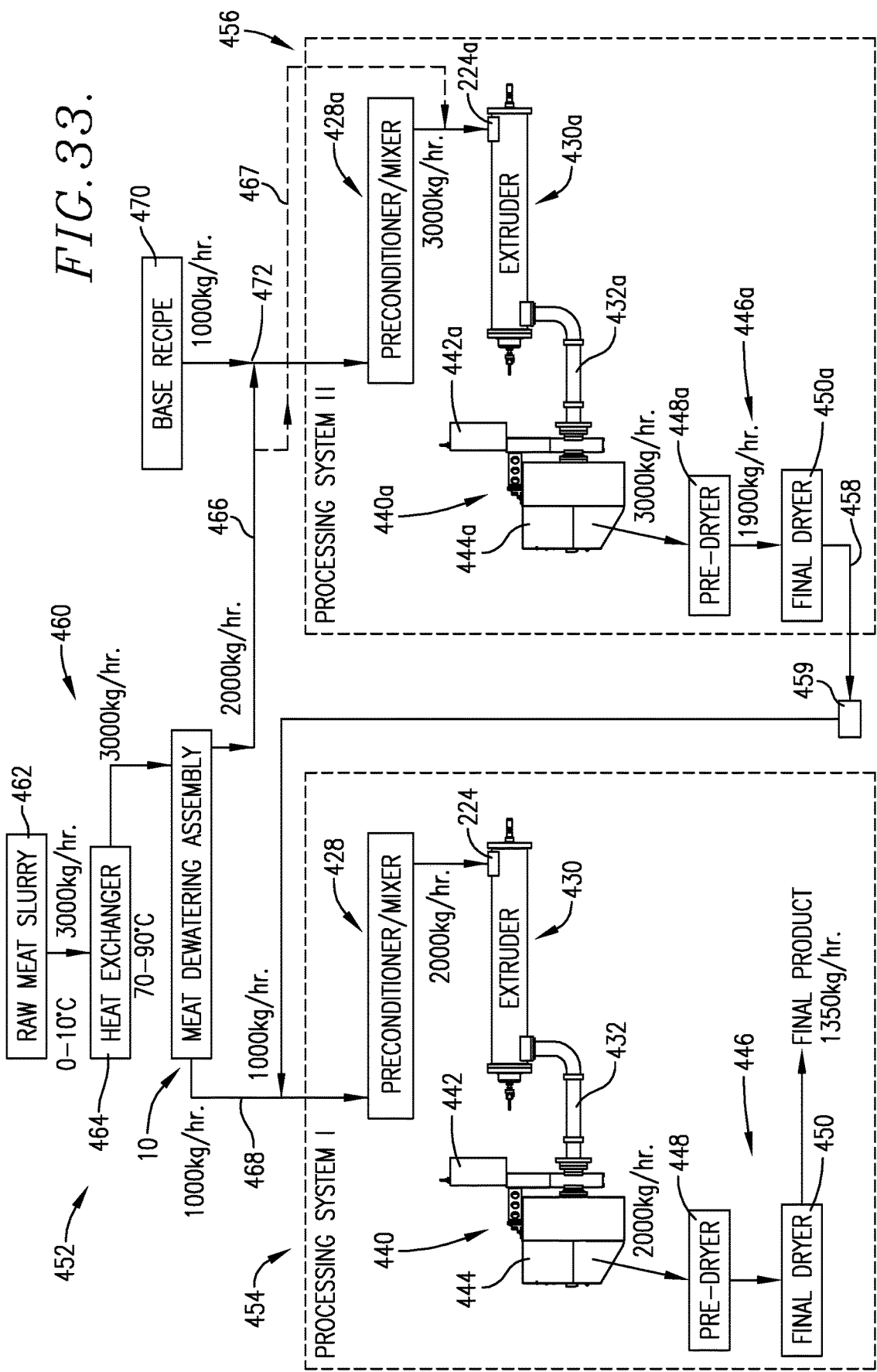
FIG. 33 is a schematic view illustrating a dual processing system in accordance with the invention for the production of high-meat content pet foods.

Dual Processing System for Pet Food Production—FIG. 33

FIG. 33 is a schematic illustration of a processing system 452 in accordance with the invention, which includes the principal equipment used in the system as well as nominal material balance data for an exemplary process. Generally, the system 452 includes a processing system I (numeral 454) and a processing system II (numeral 456). The systems I and II are substantially identical in terms of equipment, save for the fact that the capacities of the system II components are greater than those of system I. Thus, each system I and II has a preconditioner/mixer 428, 428a, which is designed to mix the incoming ingredients and to (in some cases) partially pre-cook the latter. These devices are advantageously Wenger HIP preconditioners of the type disclosed in U.S. Pat. No. 7,674,492, which is incorporated by reference herein in its entirety. An extruder 430, 430a is operatively coupled with a corresponding preconditioner/mixer 428, 428a, and may be a twin screw having hollow core screws such as those illustrated in FIGS. 15-32. Each extruder 430, 430a has an outlet pipe 432, 432a leading to a terminal assembly 440, 440a, the latter having an adjustable back pressure valve 442, 442a equipped with an extrusion die and an extrudate hood 444, 444a. These components are described in U.S. Pat. No. 8,999,422, which is incorporated by reference herein in its entirety. Each system also has a drying assembly 446, 446a with a pre-dryer 448, 448a and a final dryer 450, 450a; again, these are described in the referenced U.S. Pat. No. 8,999,422. A conveying line 458, with an optional intermediate storage tank 459, extends from the output of final dryer 450a of system II to the preconditioner/mixer 428 of system I. A hammermill or similar device is provided in line 458 downstream of the final dryer in order to reduce the size of the intermediate product to about 1-2 mm, usually about 1.2 mm The overall system 452 also has a meat slurry assembly 460 including a meat slurry source 462 leading to a heat exchanger 464, which in turn is directed to a meat dewatering assembly 10, described above. The two outputs from the assembly 10 include a recovered liquids line 466 and a meat cake delivery line 468 leading to the input of preconditioner/mixer 428. As illustrated, the system II has a source 470 of base recipe ingredients, together with a delivery line 472 leading to preconditioner/mixer 428a. The recovered liquids line 466 is coupled with line 472 so as to deliver both recovered liquids from meat dewatering assembly 10, and base recipe ingredients from the source 470, to the preconditioner/mixer 428a. In an alternate procedure, a line 467 may be provided from the line 466 for entry of a portion of the recovered liquids directly into extruder inlet 244a, thus bypassing preconditioner 428a.

As illustrated in FIG. 33, the systems I and II are equipped with respective conduit assemblies which convey materials into and through the systems I and II in accordance with the invention.

In the practice of the methods of the invention, raw meat slurry (e.g., emulsified poultry meat) is first directed to a heat exchanger 464 in order to heat the slurry in order to facilitate dewatering thereof. The heated slurry is directed to assembly 10, to generate a meat cake delivered to line 468, and a liquid fraction delivered to line 466.

Although the operation of systems I and II are individually described below, it will be appreciated that once the operation of the overall system 452 is stabilized, systems I and II may be operating simultaneously. Alternately, a user may choose to run systems I and II separately, with temporary storage of the dewatered meat cake, the liquid fraction, and the intermediate product, until these are needed in system I.

Considering first the operation of processing system II, the recovered liquids from assembly 10 are delivered to preconditioner/mixer 428a along with base recipe ingredients typically including sources of protein, fat, and starch of the type used in extruded pet foods. The protein sources may be selected from meat or plant-derived proteins, and the starch sources are typically grain or like products (e.g., corn, wheat, soy, potato, pea, beet, flax, sorghum). These ingredients are mixed and/or preconditioned in the device 428a, and are then delivered to input 224a of extruder 430a. The preconditioned ingredients are then subjected to increasing levels of temperature, pressure, and shear, and are delivered via the pipe 432a and ultimately through the assembly 440a, in the form of wet cut extrudate. This extrudate is then directed through the drying assembly 446a to generate an intermediate product. The latter is transported via product conveying line 458 for delivery to the preconditioner/mixer 428 of system I, along with the meat cake via line 468 from assembly 10. The meat cake/intermediate product mix is then mixed and/or preconditioned and fed to inlet 224 of extruder 430. Again, this mix is subjected to increasing levels of heat, pressure, and shear and is ultimately delivered through pipe 432 to assembly 440, where it is extruded and cut as a wet extrudate. This extrudate passes through the drying assembly 446 to ultimately create the final product, as illustrated.

As is evident from the foregoing discussion, the heat exchanger 464 is designed to heat the incoming meat slurry (e.g., emulsified poultry such as chicken or turkey) to facilitate dewatering thereof, and the purpose of the meat dewatering assembly is to treat the heated high-moisture meat products to substantially reduce the moisture levels thereof, creating respective low-moisture meat cake and liquid fractions. The system I and system II preconditioner/mixer devices are provided in order to mix the incoming ingredients to give substantially homogeneous mixtures. Normally, these devices are operated without addition of moisture, in order to avoid build-up of excess water in the products. The devices may be of different designs, although available preconditioners used in the extrusion art are preferred.

The system I and system II extruders are designed to take incoming mixed products and to subject such mixed products to increasing levels of temperature, pressure, and shear, thereby fully cooking the mixtures. The latter are then passed through a back pressure valve and an extrudate hood, the latter being fully described in U.S. Pat. No. 9,320,298, incorporated by reference herein in its entirety. The back pressure valves provide a selected degree of flow restriction and in effect throttle the associate extrusion dies. The hoods facilitate the spread of extrudate issuing from the dies to prevent agglomeration or clumping of the extrudates.

The drying assemblies are made up of relatively short pre-dryers and downstream final dryers. In some instances, it has been found that high-meat extrudates are delicate and prone to fragmentation. Staged drying serves to set these products and preserve the integrity thereof. The following tables set forth typical approximate operating conditions and parameters for the meat dewatering system as well as processing systems I and II.

TABLE 1

Meat Dewatering System

|  | Broad Range | Narrow Range |
|---|---|---|
| Raw Meat Slurry | | |
| Temperature | −3-10° C. | −1-5° C. |
| Fat Content | 8-16% by weight | 10-12% by weight |
| Protein Content | 12-16% by weight | 13-15% by weight |
| Heat Exchanger | | |
| Slurry Output Temperature | 50-90° C. | 70-80° C. |
| Meat Dewatering Assembly | | |
| Meat Cake Fraction | 25-50% by weight | 28-35% by weight |
| Liquid Fraction | 50-70% by weight | 65-72% by weight |

TABLE 2

Processing System I

|  | Broad Range | Narrow Range |
|---|---|---|
| Preconditioner/Mixer | | |
| Operating Temperature | 25-90° C. | 27-80° C. |
| Residence Time | 50-80 seconds | 90-120 seconds |
| Extruder | | |
| Maximum Temperature | 80-130° C. | 90-120° C. |
| SME | 6-60 kWhr/ton | 10-57 kWhr/ton |
| Residence Time | 5-60 seconds | 15-30 seconds |
| Pre-Dryer | | |
| Operating Temperature | 120-190° C. | 160-180° C. |
| Residence Time | 3-10 minutes | 3-6 minutes |
| Final Dryer | | |
| Operating Temperature | 100-160° C. | 110-130° C. |
| Residence Time | 8-26 minutes | 10-16 minutes |
| Final Food Product | | |
| Moisture Content | 4-12% by weight | 6-10% by weight |
| Fat Content | 10-15% by weight | 12-18% by weight |
| Starch Content | 10-30% by weight | 12-25% by weight |
| Protein Content | 24-40% by weight | 26-36% by weight |

TABLE 3

Processing System II

|  | Broad Range | Narrow Range |
|---|---|---|
| Preconditioner/Mixer | | |
| Operating Temperature | 25-90° C. | 27-80° C. |
| Residence Time | 50-80 seconds | 90-120 seconds |
| Extruder | | |
| Maximum Temperature | 80-139° C. | 90-115° C. |
| SME | 6-60 kWhr/ton | 10-25 kWhr/ton |
| Residence Time | 5-60 seconds | 15-30 seconds |
| Pre-Dryer | | |
| Operating Temperature | 120-80° C. | 160-180° C. |
| Residence Time | 3-8 minutes | 3-6 minutes |
| Final Dryer | | |
| Operating Temperature | 100-160° C. | 120-130° C. |
| Residence Time | 8-24 minutes | 10-16 minutes |

TABLE 3-continued

Processing System II

| Intermediate Product | Broad Range | Narrow Range |
|---|---|---|
| Moisture Content | 4-12% by weight | 6-10% by weight |
| Fat Content | 6-15% by weight | 8-12% by weight |
| Starch Content | 20-60% by weight | 30-50% by weight |
| Protein Content | 12-20% by weight | 12-18% by weight |

*SME is specific mechanical energy input during extrusion

Example

In this example, an animal food was prepared using a typical dry-ingredient base recipe and mechanically separated chicken (MSC) slurry. The dry ingredient recipe is set forth below.

Dry Recipe:
Whole potato flour 48%
Yellow pea flour 37%
Beet pulp 9%
Flax meal 4%
Salt 2%

In step 1, MSC was pumped into a steam-heated Terlotherm C indirect heat exchanger at a rate of 2000 kg/hr, where the incoming MSC had a moisture content of 78% and a temperature of 0° C. The heated meat output had a temperature of 80-90° C., and was directed to a meat dewatering device 10, illustrated in FIGS. 1-12, again at a rate of 2000 kg/hr, with the screws 52, 54 rotated at 20 rpm. This produced a dewatered meat cake output having a temperature of 76° C. at a rate of 750 kg/hr and a liquid output of 1250/kg/hr at 80° C. The meat cake was stored in drums, and the liquid output was stored in a temporary holding tank.

In step 2, a Wenger Thermal Twin 760 dual shaft hollow core extruder (see FIG. 15) was employed having the screw design illustrated in FIGS. 26-32, having a delivery pipe 432a, back pressure valve 442a, dispersal hood 440a, and a drying assembly 446a. A Wenger HIP preconditioner was provided upstream of the extruder in order to receive and mix the meat cake and a portion of the liquid ingredients prior to extrusion thereof; the remainder of the liquid was fed directly to the extruder. In this step 2, an engineered food ingredient was prepared using the above dry ingredient recipe and the liquid output from step 1, where both inputs were directed into and through the preconditioner/extruder equipment as described, without any additional moisture inputs, followed by drying. The drying step involved passage through a three-zone/two-pass pre-dryer followed by a three-zone final dryer/cooler. The following table sets forth the conditions of this step 2 run.

TABLE 4

| | |
|---|---|
| Dry Recipe Feed Rate to HIP (kg/hr) | 500 |
| Liquid Feed Rate to HIP (kg/hr) | 325 |
| HIP Large Side Shaft Speed (rpm) | 120 |
| HIP Small Side Shaft Speed (rpm) | 550 |
| Preconditioner Discharge Temperature (° C.) | 30 |
| Liquid Feed Rate to Extruder (kg/hr) | 34 |
| Extruder Shaft Speed (rpm) | 311 |
| Extruder Head Pressure (kpa) | 26 |
| Extruder Motor Load (%) | 53 |
| Extruder Motor Power (kw) | 8 |
| Specific Mechanical Energy (kWhr/ton) | 16 |
| Extruder Discharge Temperature (° C.) | 79 |
| Moisture of Extrudate (%) | 39.5 |
| Bulk Density of Extrudate (g/l) | 590 |
| Pre-Dryer Temperature (° C.) | 180 |
| Pre-Dryer Pass 1 Retention Time (min) | 1 |
| Pre-Dryer Pass 2 Retention Time (min) | 2 |
| Pre-Dryer Pass 3 Retention Time (min) | 3 |
| Moisture after Pre-Dryer (%) | 28.0 |
| Bulk Density after Pre-Dryer (g/l) | 488 |
| Final dryer Zone 1 Temp (° C.) | 125 |
| Final dryer Zone 2 Temp (° C.) | 117 |
| Final dryer Zone 3 Temp (° C.) | 105 |
| Final Dryer Pass 1 Retention Time (min) | 8 |
| Final Dryer Pass 2 Retention Time (min) | 8 |
| Moisture after Final Dryer/Cooler (g/l) | 8.1 |
| Bulk Density after Final Dryer/Cooler (g/l) | 475 |

The engineered ingredient product from step 2 was ground to a powder and used in step 3, wherein a final product in accordance with the invention was produced by preconditioning/extrusion of the dry powder together with the meat cake from step 1. The following table sets forth the conditions of this step 3 run.

TABLE 5

| | |
|---|---|
| Step 2 Powder Feed Rate to HIP (kg/hr) | 494 |
| Step 1 Meat Cake Feed Rate to HIP (kg/hr) | 520 |
| HIP Large Side Shaft Speed (rpm) | 120 |
| HIP Small Side Shaft Speed (rpm) | 550 |
| Preconditioner Discharge Temperature (° C.) | 27 |
| Feed Rate to Extruder (kg/hr) | 1014 |
| Extruder Shaft Speed (rpm) | 432 |
| Extruder Motor Load (%) | 77 |
| Extruder Motor Power (kw) | 28 |
| Specific Mechanical Energy (kWhr/ton) | 57 |
| Extruder Discharge Temperature (° C.) | 114 |
| Moisture of Extrudate (%) | 39.7 |
| Bulk Density of Extrudate (g/l) | 624 |
| Pre-Dryer Temperature (° C.) | 170 |
| Pre-Dryer Pass 1 Retention Time (min) | 1 |
| Pre-Dryer Pass 2 Retention Time (min) | 3 |
| Pre-Dryer Pass 3 Retention Time (min) | 4 |
| Moisture after Pre-Dryer (%) | 21.8 |
| Bulk Density after Pre-Dryer (g/l) | 558 |
| Final dryer Zone 1 Temp (° C.) | 134 |
| Final dryer Zone 2 Temp (° C.) | 83 |
| Final dryer Zone 3 Temp (° C.) | 105 |
| Final Dryer Pass 1 Retention Time (min) | 12 |
| Final Dryer Pass 2 Retention Time (min) | 10 |
| Moisture after Final Dryer/Cooler (g/l) | 20* |
| Bulk Density after Final Dryer/Cooler (g/l) | 500 |

This example illustrates that the methods of the invention can be completed using only a single processing system made up of a mixer/preconditioner, an extruder, and a drying system. If this stepwise strategy is employed, it is necessary to provide a holding tank for the liquid derived from meat dewatering assembly 10, and a storage tank for the intermediate extrudate product. Such stepwise processing is not preferred for continuous commercial manufacture of feeds, owing to the necessity of holding the liquid fraction and intermediate product, and because the production rates are reduced by at least 50%, as compared with use of a dual processing system apparatus, as depicted in FIG. 33.

* The final dryer did not complete the drying process, and the product was thereafter further dried to approximately 8-10% by weight.

While the invention has been described using dewatered meat cake as the sole meat source for the final pet food products, the invention is not so limited. That is, use can be made of other sources of fresh meat apart from the treated slurries. Thus, the total meat content of the finished products can consist essentially of dewatered meat, or a mixture of such dewatered meat with whole meat and/or meat emulsion(s). Where the total meat content is made up of a combination of dewatered meat and other meat sources such as emulsified meat, the dewatered meat should be present at a level of from about 50-100% by weight, more preferably from about 85-100% by weight, based upon the total weight of the meat content taken as 100% by weight; correspondingly, the meat emulsion, if used, should be present at a level of from about 0-50% by weight, more preferably from about 1-15% by weight, again based upon the total weight of the meat content taken as 100% by weight.

Advantageously, the total meat content of the products consists essentially of dewatered meat, because adding untreated meat or meat slurry emulsions increases the moisture content of the mixture to be extruded, which is to be avoided.

In all cases, whether the total meat content is made up entirely of dewatered meat or a combination of dewatered meat and untreated meat emulsion and/or meat slurry, it is important to understand the basis for determining the meat content of the products. For example, (1) the total meat content may be expressed as a percentage of the dry recipe components, i.e., the dry components are taken as 100% by weight; or (2) the total meat content may be expressed as a percentage of the total recipe, i.e., the total recipe including the total meat content is taken as 100% by weight; or (3), similar to (1), the total meat content may be expressed as an equivalent meat slurry level, i.e., as if the total meat content were present as meat slurry, with the meat slurry level expressed as a percentage of the total dry recipe components; or (4), similar to (2), the equivalent meat slurry level may be expressed as a percentage of the total recipe components taken as 100% by weight. From a commercial perspective, current labeling laws and regulations allow the pet food manufacturer to advantageously express the meat content as in (4).

The following Table 6 sets forth approximate broad and preferred ranges in the case where the meat content is entirely in the form of dewatered meat and expresses those ranges as set forth in (1)-(4) above. It should be understood in this respect that the data in columns (3) and (4) are, correspondingly, the values of columns (1) and (2) multiplied by 3.33; this reflects the fact that each pound of dewatered meat was made from 3.33 pounds of starting meat slurry. Moreover, the values of column (2) are equal to the values of column (1) divided by the values of column (1) plus 100, and the values of column (4) are equal to the values of column (3) divided by the values of column (3) plus 100.

TABLE 6

| Process Range | (1) Dewatered meat expressed as % of the dry recipe components | (2) Dewatered meat expressed as % of the total recipe components | (3) Equivalent meat slurry level expressed as % of dry recipe components | (4) Equivalent meat slurry level expressed as % of the total recipe components |
|---|---|---|---|---|
| Broad range | 85.0-120.0 | 46.0-54.5 | 156.0-400.0 | 60.9-80.0 |
| Preferred range | 85.0-105.0 | 46.0-51.2 | 156.0-350.0 | 60.9-77.8 |

The above Table 6 represents preferred implementations of the invention wherein the total meat content is in the form of dewatered meat. If the total meat content includes untreated meat emulsion or meat slurry, such will normally reduce the total meat content which can be employed in the products, inasmuch as meat or meat slurry will have a greater moisture content than the dewatered meat. As noted above, the total moisture content of the mixture fed to the extruder is important, in order to permit proper extrusion processing of the mixture. Typically, this moisture content should be from about 25-50% by weight, more preferably from about 35-45% by weight, based upon the total weight of the mixture fed to the extruder during the final extrusion step taken as 100% by weight.

Figure 34:
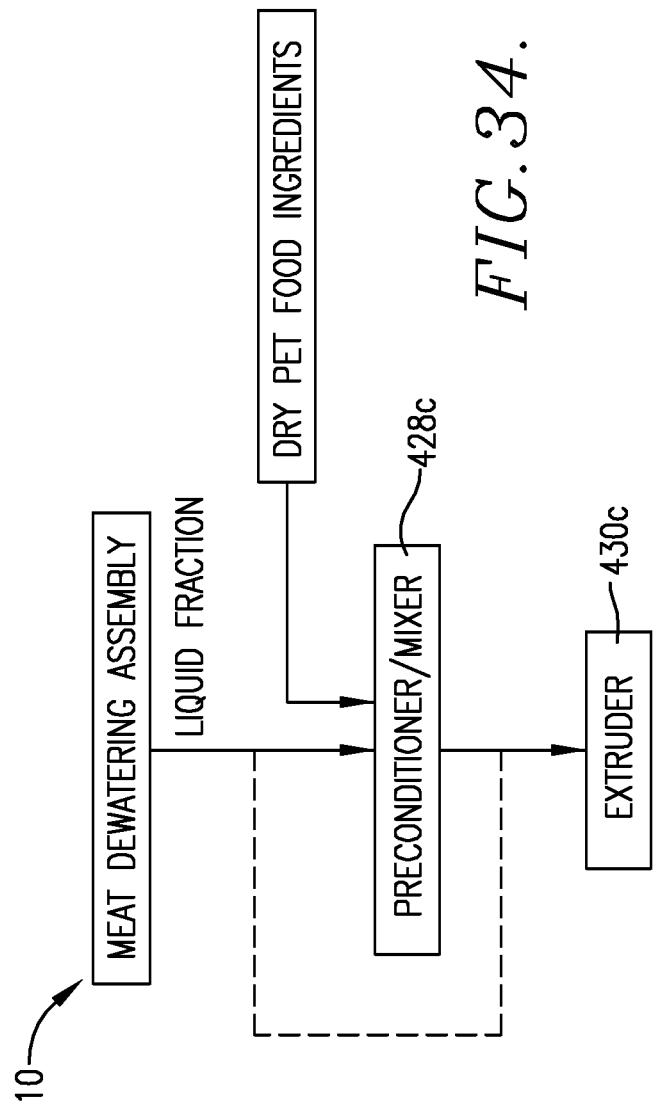
FIG. 34 is a schematic view illustrating another embodiment wherein the liquid fraction from a meat dewatering device is directed to the preconditioner and/or extruder for the manufacture of pet foods.

Alternate Use of Liquid Fraction from Meat Dewatering Device—FIG. 34

In another embodiment, depicted in FIG. 34, a meat dewatering system, comprising a heat exchanger 464 and a meat dewatering assembly 10, is operated with a meat slurry input to generate a liquid fraction and a meat cake solids fraction, in the same manner disclosed with respect to the embodiment of FIG. 33; the parameters of the meat dewatering system are the same as those set forth in Table 1 above.

The liquid fraction output from assembly 10 is directed to a preconditioner/mixer 428c where such liquids are mixed with dry pet food ingredients (typically including sources of protein, fat, and starch), where the dry ingredients are mixed with the liquid fraction and supplemental water or steam. The output from preconditioner 428c is then directed to an extruder 430c for final processing to produce the finished pet food. The as-extruded food would typically be dried to a moisture content of around 8-12% by weight. As illustrated in dotted line in FIG. 34, some or all of the liquid fraction may be added directly to the extruder without preconditioning.

The mixer is preferably an HIP preconditioner described above, whereas the extruder may be a single screw or twin-screw extruder.

In this embodiment, the liquid fraction is used in lieu of some or all of the water and/or steam typically used in the preconditioner or extruder. Moreover, the meat cake from assembly 10 is not used in the finished pet foods of this embodiment.

We claim:

1. A method of making an animal food product comprising the steps of:
   treating emulsified meat to yield a dewatered meat fraction and a liquid fraction;
   initially passing said liquid fraction through a preconditioner/mixer, an extruder, and a drying assembly, and, during or before said passage of said liquid fraction through said preconditioner/mixer, adding dry feed ingredients to the liquid fraction to create an intermediate, passing the intermediate through said extruder and drying assembly to produce an extruded and dried intermediate product comprising said dry feed ingredients and said liquid fraction;
   combining said intermediate product from said initial passing step and said dewatered meat preconditioner/mixer; and subsequently passing said combined intermediate product and dewatered meat fraction into and through an extruder and a drying assembly to create said animal food product.

2. The method of claim 1, said initial processing stage to create the intermediate being carried out in a second processing system including a second preconditioner/mixer, a second extruder, and a second drying assembly, said subsequent passing stage being carried out in a first processing system including a first preconditioner/mixer, a first extruder, and a first drying assembly.

3. The method of claim 1, said emulsified meat being emulsified poultry meat.

4. The method of claim 1, said emulsified meat having a liquid fraction of from about 50-70% by weight, based upon the total weight of the emulsified meat taken as 100% by weight.

5. The method of claim 1, said emulsified meat having a fat content of from about 8-16% by weight, based upon the total weight of the emulsified meat taken as 100% by weight.

6. The method of claim 1, said treating stage comprising the steps of:
passing said emulsified meat into and through a meat dewatering assembly, said assembly comprising a pair of elongated, non-parallel, tapered and intermeshed helically flighted screws, each screw presenting a longitudinal axis, said screws oriented with the included angle between the longitudinal axes thereof being from about 1-7°, the helical fighting of the screws cooperatively presenting nip clearances along the length of the screws;
counter-rotating said screws during passage of said emulsified meat through the dewatering assembly, and causing meat therein to be compressed within said nip clearances in order to expel a liquid fraction from the meat, said method being carried out at substantially atmospheric pressure; and
recovering dewatered meat.

7. The method of claim 6, including the step of heating said emulsified meat prior to passage through the dewatering assembly.

8. The method of claim 6, said dewatering assembly including a perforated housing surrounding said screws, including the step of causing said liquid fraction expelled from the meat to pass through the housing perforations.

9. The method of claim 2, the residence time of said liquid fraction and dry feed ingredients in said second preconditioner/mixer being from about 50-80 seconds.

10. The method of claim 2, the residence time of said intermediate in said second extruder being from about 5-60 seconds.

11. The method of claim 2, the residence time of said combined intermediate product and said dewatered meat fraction in said first preconditioner/mixer being from about 50-80 seconds.

12. The method of claim 2, the residence time of said combined intermediate product and said dewatered meat fraction in said first extruder being from about 50-80 seconds.

13. The method of claim 2, the maximum temperature of said combined intermediate product and said dewatered meat fraction in said first extruder being from about 80-130° C.

14. The method of claim 2, said second drying assembly including a pre-dryer and a final dryer.

15. The method of claim 2, said first drying assembly including a pre-dryer and a final dryer.

16. The method of claim 1, said dry feed ingredients including respective quantities of protein, fat, and starch.

17. The method of claim 1, said animal food product having a protein content of from about 24-40% by weight based upon the total weight of the animal food product taken as 100% by weight.

18. The method of claim 1, said animal food product having a fat content of from about 10-15% by weight based upon the total weight of the animal food product taken as 100% by weight.

19. The method of claim 1, said animal food product having a meat content of from about 46-54.5% by weight based upon the total weight of the animal food product taken as 100% by weight.

20. Apparatus for the production of an animal food product comprising:
first and second processing systems each including, in serial order, a preconditioner/mixer, an extruder, and a drying assembly;
a meat dewatering assembly operable to treat a meat slurry and generate a dewatered meat cake and a liquid fraction, and to deliver said meat cake to the preconditioner/mixer of said first processing system;
structure for delivery of dry pet food ingredients to the preconditioner/mixer of said second processing system;
a first conduit assembly operable to deliver said liquid fraction to the preconditioner/mixer of said second processing system, in order to form a mixture of said liquid fraction with said dry pet feed ingredients, and to deliver said liquid fraction/dry ingredients mixture to the extruder of said second processing system, said second processing system extruder operable to create a second processing system extrudate of said liquid fraction/dry ingredients mixture,
said first conduit assembly operable to feed said second processing system extrudate to said drying assembly of said second processing system in order to create dried extrudate; and
a second conduit assembly operable to deliver said dried extrudate to the preconditioner/mixer of said first processing system, in order to create a dried extrudate/meat cake mixture, and to deliver the dried extrudate/meat cake mixture to the extruder of the first processing system, said extruder operable to create a first processing system extrudate from said dried extrudate/meat cake mixture,
said second conduit assembly operable to feed said first processing system extrudate to the drying assembly of said first processing system, to thereby create said animal food product.

21. The apparatus of claim 20, the extruder of said first processing system being a twin-screw extruder having hollow core screws.

22. The apparatus of claim 20, the extruder of said second processing system being a twin-screw extruder having hollow core screws.

23. The apparatus of claim 20, the drying assembly of said first processing system including a pre-dryer and a final dryer.

24. The apparatus of claim 20, the drying assembly of said second processing system including a pre-dryer and a final dryer.

25. The apparatus of claim 20, said meat dewatering assembly comprising a pair of axially rotatable, intercalated, converging screws.

* * * * *

UNITED STATES PATENT AND TRADEMARK OFFICE
CERTIFICATE OF CORRECTION

PATENT NO. : 10,736,340 B1
APPLICATION NO. : 16/287866
DATED : August 11, 2020
INVENTOR(S) : Galen J. Rokey and LaVon Wenger Page 1 of 1

It is certified that error appears in the above-identified patent and that said Letters Patent is hereby corrected as shown below:

In the Claims

Column 16, In Claim 1, Line 15 insert --fraction in a-- between the words "meat" and "preconditioner".

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*